(12) United States Patent
Frouin et al.

(10) Patent No.: US 7,177,307 B2
(45) Date of Patent: Feb. 13, 2007

(54) DEVICE AND METHOD FOR TRANSMISSION IN A SWITCH

(75) Inventors: Laurent Frouin, Rennes (FR); Arnaud Closset, Cesson Sevigne (FR); Falk Tannhauser, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 844 days.

(21) Appl. No.: 10/055,939

(22) Filed: Jan. 28, 2002

(65) Prior Publication Data
US 2002/0126657 A1 Sep. 12, 2002

(30) Foreign Application Priority Data
Feb. 14, 2001 (FR) ................... 01 02037

(51) Int. Cl.
*H04L 12/50* (2006.01)
(52) U.S. Cl. ..................... 370/362; 370/465
(58) Field of Classification Search ............... 370/466, 370/352, 498, 503
See application file for complete search history.

(56) References Cited

U.S. PATENT DOCUMENTS

| | | | |
|---|---|---|---|
| 4,542,507 A * | 9/1985 | Read ................... | 370/248 |
| 5,088,091 A | 2/1992 | Schroeder et al. ...... | 370/94.3 |
| 5,422,881 A | 6/1995 | May et al. ............. | 370/60 |
| 5,742,597 A | 4/1998 | Holt et al. ............ | 370/390 |
| 5,809,021 A * | 9/1998 | Diaz et al. ............ | 370/364 |
| 6,130,891 A * | 10/2000 | Lam et al. ............. | 370/401 |
| 6,141,346 A * | 10/2000 | Caldara et al. ......... | 370/390 |
| 6,683,872 B1 * | 1/2004 | Saito et al. ........... | 370/380 |

FOREIGN PATENT DOCUMENTS

| | | |
|---|---|---|
| EP | 0511834 A2 | 11/1992 |
| EP | 0868054 A2 | 9/1998 |
| WO | WO 95/08887 A | 3/1995 |

OTHER PUBLICATIONS

Vincent Reibaldi, "Conception et Réalisation D'un Routeur De Paquets À Hautes Performances", Soutenue le 3 Juillet 1997.
Yamanaka, et al., "160 Gbit/s High Speed ATM Switching System," NTT Review, vol. 9, No. 2, Mar. 1997.

* cited by examiner

Primary Examiner—Chau Nguyen
Assistant Examiner—Christopher Grey
(74) Attorney, Agent, or Firm—Fitzpatrick, Cella, Harper & Scinto

(57) ABSTRACT

A protocol data unit switching implements switching means used for the selective interconnection of a transmitter port and at least one receiver port selected from among at least two receiver ports by means of at least one internal bus, each of the protocol data units being constituted by at least one piece of elementary data. The switching implements a synchronization mechanism defining time slots, known as connection cycles, on at least one of said internal buses; a mechanism for the allocation of at least one of said connection cycles to each of the selected receiver ports; and a mechanism for the writing of at least one piece of elementary data in the allocated connection cycle or cycles so as to enable the broadcasting of elementary data to said selected receiver ports.

37 Claims, 10 Drawing Sheets

DEVICE AND METHOD FOR TRANSMISSION IN A SWITCH

BACKGROUND OF THE INVENTION

1. Field of the Invention

The present invention pertains to the field of switched networks and, especially, to data transmission in a switched network at high bit rates.

It may be recalled that switching enables the accurate routing of data between a source and one or more destinations, these data being organized in protocol data units and, for example, in packets.

2. Description of the Prior Art

In the prior art, two different switching techniques are known:

circuit switching; and packet switching.

A circuit switched network interconnecting several devices essentially uses Time Division Multiplexing or TDM. This technique enables synchronous data transmission by the allocation of time slots on the TDM bus to a variety of synchronous communications. At input, a source apparatus writes data on one or more time slots allocated to it. At output, one or more target apparatuses read the data in the time slot to which they are attached.

According to this technique, the time slots can be used as broadcasting channels. These broadcasting channels will be used in writing by only one source and in reading by several targets. Besides, the synchronous nature of the mechanism ensures that all the useful data will be suitably processed by all the apparatuses, both source and target.

In a packet switched network, the data transfer between the source apparatuses and the target apparatuses assumes that the network connecting them is available. In other words, it depends on the status of the network. Thus, a handshake type of protocol is provided to ensure not only that the data is available but also that it has been taken into account.

This is especially true when carrying out wormhole routing in which the data being transmitted can be distributed among several intermediate elements of the switching means (the decision to carry out a <<wormhole routing>> is taken before the complete reception of the packet, unlike in the case of <<store and forward routing>>) and/or when source and target apparatuses have FIFO (<<First In First Out>>) type buffer memories connected to both the source and the target ports.

This becomes even more critical in certain cases, especially when a target port has to cope with congestion, thus having a relatively lower bit rate at the output of a FIFO.

Besides, the packet switching technique does not allow for efficient multicast transmission (namely transmission from one source port to at least two target ports) except if costly and complicated switching matrixes known as <<crossbars>> are implemented.

The thesis report "Conception and realisation of high performance packet router", Reube, 3$^{rd}$ Jul., 1997, describes a (8×8) wormhole switch relying on full crossbar implementation between parallel ports.

The multicast capability is addressed through slot labelling, as implemented for the C104 chip described in the U.S. Pat. No. 5,422,881 by Inmos Limited, and the patent U.S. Pat. No. 5,088,091 by DEC which illustrates the routing of the broadcasting through a routing table. Both solutions rely on crossbar switch implementation.

Today, in the prior art, there are no switched architecture buses in packet switching networks to provide simple and efficient multicast functions. Crossbar-based solutions exist but they remain complex and costly.

A first drawback of the prior art is that it cannot be used to carry out efficient switching in all circumstances, in optimizing the performance characteristics (par example, the bit rate for each communication or the total bit rate).

In particular, there are no techniques without <<crossbar>> switching that prove to be efficient and relatively inexpensive to implement;

when the switchings are applied to unicast type transmissions; and when the switchings are applied efficiently to multicast type transmissions.

Thus, the prior art systems generally favor multicast switching.

Another drawback is the fact that the prior art techniques using the "store and foreword routing" architecture have a high degree of latency and require greater memory capacity.

The invention according to its different aspects is aimed especially at overcoming these prior art drawbacks.

More specifically, it is a goal of the invention to provide a technique for multicast switching while enabling an optimum bit rate in the case of unicast transmission.

Furthermore, a call of the invention is to enable the performance of an "wormhole type routing" while minimizing the packet transfer latency both for unicast transmission and for multicast transmission.

It is yet another goal of the invention to provide an architecture that thus guarantees low-cost implementation and is a relatively uncomplicated to implement.

SUMMARY OF THE INVENTION

These goals as well as others that shall appear hereinafter are achieved according to the invention by means of a protocol data unit switching method that implements switching means used for the selective interconnection of a transmitter port and at least one receiver port selected from among at least two receiver ports by means of at least one internal bus, each of the protocol data units being constituted by at least one elementary piece of data, wherein the method implements:

a synchronizing mechanism defining time slots, known as connection cycles, on at least one of the internal buses;

a mechanism for the allocation of at least one of the connection cycles to each of the selected receiver ports; and a mechanism for the writing of at least one piece of elementary data in the allocated connection cycle or cycles so as to enable the broadcasting of elementary data to the selected receiver ports.

A protocol data unit (PDU) is a unit of data exchanged at the level of a protocol. It may be for example a packet comprising at least one piece of elementary data.

A connection cycle or protocol data unit transmission cycle is herein a cycle for the transmission of one complete unit of data. This cycle is generally marked by a particular signal (for example the signal Rxl-connected used in the preferred embodiment described here below) that is validated throughout the duration of the cycle.

An elementary piece of data is typically a binary data (bit) or a multiplet (byte) especially having 16, 32 or 64 bytes depending on the width of the bus used to transfer data into the device implementing the method.

Thus, the invention is used to implement unicast and multicast transmissions performed according to a synchronized switching method.

Furthermore, the performance is optimized in all conditions, especially in multicast and unicast conditions.

According to one particular characteristic, the writing mechanism comprises a verification step determining whether each of the pieces of elementary data has been received by each of the selected receiver ports.

According to one particular characteristic, the mechanism for writing the elementary data in each of the allocated connection cycles is reiterated so long as the piece of elementary data has not been received by all the receiver ports.

Thus, all the elementary data of a protocol data unit are advantageously received accurately by each of the destination receiver ports of the protocol data unit.

According to one special characteristic of the method, the allocation mechanism comprises a step of association of each of the connection cycles to each of the selected receiver ports.

Thus, tie invention is advantageously well adapted to processing the switching of protocol data units in multicast mode.

According to one particular characteristic, the allocation mechanism comprises:
  a step for the detection of a transmitter port requesting the transfer of at least one protocol data unit towards at least one selected receiver port;
  a step for verifying that the selected receiver ports or ports are ready to receive the protocol data unit or units; and
  a step for the validation of at least one connection cycle used for the writing of the elementary data of the protocol data unit or units in the selected receiver ports during the validated connection cycle or cycles when the verification is positive.

Thus, advantageously, the invention can be used to assign at least one connection cycle when the receiver ports can effectively receive the protocol data unit or units whether in unicast or in multicast mode.

According to one particular characteristic, the method implements at least one first input bus multiplexing the pieces of elementary data coming from at least two transmitter ports and/or at least one first output bus multiplexing the pieces of elementary data addressed to at least two receiver ports.

According to one particular characteristic, the transmitter and receiver ports are organized in pairs each combining a transmitter port and a receiver port, each pair being associated with a distinct link.

According to one particular characteristic, the method implements at least one link connected to transmitter ports and/or to receiver ports.

According to one particular characteristic, the link belongs to the group comprising:
  the IEEE 1355 or equivalent links; and
  the external buses According to one particular characteristic, the method is capable of switching data whose bit rate is greater than or equal to 100 Mbits/s.

Thus, the invention can advantageously be used to switch data at a high bit rate.

According to one particular characteristic, the writing mechanism comprises at least one step for the writing of each piece of elementary data of each of the protocol data units, each of the steps for writing each piece of elementary data comprising:
  a sub-step for the acceptance, by each of the selected receiver ports, of the writing of each piece of elementary data to be transmitted, and
  a second sub-step for the transmission of each piece of elementary data to be transmitted, to each of the selected receiver ports.

Thus, in a preferred way, the invention is used for the transmission of one or more protocol data units to a plurality of receiver ports by managing a transmission that is authorized by each of the receiver ports at the level of each piece of elementary data contained in the protocol data unit or units to be transmitted.

Furthermore, the invention can advantageously be used to avoid the problems of congestion within receiver ports while optimizing the total data bit rate.

According to one particular characteristic, during the acceptance stage, the acceptance is conditioned by a degree of filling of a reception memory associated with the selected receiver port, for each of the receiver ports.

According to a particular characteristic, the memory comprises at least one FIFO.

According to one particular characteristic of the method, the writing mechanism comprises at least one step of arbitration for at least one bus connecting a set of at least one input port comprising the transmitter port to a set containing least one output port comprising the receiver ports, the arbitration step being carried out by a switching matrix consisting of crosspoints capable of transmitting pieces of elementary data between an input port and an output port, and organized in rows and columns,
  each column (or row respectively) being, capable of managing the reception of elementary data coming from an input port associated with the column (or row respectively); and
  each row (or column respectively) being capable of managing the transmission of elementary data to an output port associated with the row (or column respectively);

so that a single crosspoint per row (or column respectively), at a given point in time, can enable the transmission of pieces of elementary data.

Thus, the invention advantageously enables a simple and flexible implementation of the method to optimize data transmission especially in multicast mode (by the duplication of data over several rows of the switching matrix).

It will be noted that the switching matrix may be:
  full (when the elementary data can be received from any input port and sent to any output port; in other words, all the switching operations are authorized); or
  hollow (when elementary data coming from certain input port cannot be sent to certain output ports by construction of the switching matrix; in other words only certain switching operations are authorized).

Furthermore, the invention can preferably be used to optimize the synchronization between the read operations and the write operations.

It is noted that the bus or buses can be especially of the TDM (time division multiplex) type.

Furthermore, according to one advantageous embodiment, the invention enables the making of several simultaneous connections, each row (or column respectively) being capable of managing one connection.

The invention also enables a daisy-chaining of the switching modules.

According to one particular characteristic, each protocol data unit transmitted comprises at least one header and the method furthermore comprises:
- at least one header analysis step; and/or
- at least one header modification step.

Thus, the invention advantageously enables the identification of the destinations of a protocol data unit transmitted during the analysis step.

The invention also relates to a protocol data unit switching device implementing switching means to selectively interconnect a transmitter port and least one receiver port selected from at least two receiver ports by means of at least one internal bus, each of the protocol data units being formed by at least one piece of elementary data, wherein the device implements:
- a synchronization means defining time slots, known as connection cycles, of at least one of the internal buses,
- a means for the allocation of at least one of the connection cycles to each of the selected receiver ports; and
- a means of writing at least one piece of elementary data in the allocated connection cycle or cycles, so as to enable the broadcasting of the elementary data to the selected receiver ports.

According to particular characteristics, the switching device advantageously implements certain aspects of the switching method described here above.

According to one particular characteristic, the device furthermore comprises an interfacing means delivering, to a control module and through a clock signal transmission means, clock signals regenerated from packets received by the interfacing means.

According to a particular characteristic, the device comprises an interfacing means transmitting and/or receiving information through at most two connection buses addressed to and/or coming from at least one of the means belonging to the group comprising the synchronization means, the allocation means and the writing means.

Thus, the number of connection buses between the interfacing means and other means is advantageously limited. This simplifies the implementation of the device and/or reduces its cost.

According to a particular characteristic of the device, the protocol data units sent out by at least one emitter port towards FIFOs are multiplexed by a reception linking bus.

According to a particular characteristic of the devices the protocol data units received by at least one receiver port through the FIFOs are demultiplexed on a transmission linking bus.

The invention furthermore relates to a switching apparatus comprising:
- at least one switching device;
- at least one element belonging to the group comprising:
  - the IEEE 1355 or equivalent links, and
  - the external buses.

According to one particular characteristic, the switching apparatus is connected to a data-processing apparatus.

Thus, the invention can advantageously be used for the switching of data addressed to and/or coming from a data-processing apparatus which is for example of computer, a printer, a multimedia apparatus, and audio and/or video reader/recorder, a camera, an image display apparatus (screen, television etc).

The invention also relates to an application of the method to at least one of the fields belonging to the group comprising:
- high bit rate switching;
- distributed applications;
- the transmission of digital data;
- the reception of digital data;
- audio applications,
- company networks; and
- real-time image transmission.

The invention also relates to a computer program product wherein the program comprises instruction sequences matched to the implementation of the switching method when the program is executed by computer.

The invention furthermore relates to a computer program product for the switching of protocol data units implementing switching means for the selective interconnection of the transmitter port and at least one receiver port selected from at least two receiver ports by means of at least one internal bus, each of the protocol data units being constituted by at least one piece of elementary data, the computer program product comprising program code instructions recorded on a carrier that can be used in a computer comprising:
- programming means readable by computer to carry out a synchronization step defining time slots, known as connection cycles, on at least one of the internal buses;
- programming means readable by computer to carry out a step for the allocation of at least one of the connection cycles to each of the selected receiver ports and
- programming means readable by computer to carry out a writing step for the writing of at least one piece of elementary data in the allocated connection cycle or cycles so as to enable the broadcasting of the elementary data to the selected receiver ports.

The advantages of the switching device, apparatus, application and computer program product are the same as those of the switching method and shall not be described in greater detail.

BRIEF DESCRIPTION OF THE DRAWINGS

Other features and-advantages of the invention will appear more clearly from the following description of a preferred embodiment, given by way of a simple and non-restrictive illustrative example and from the attended drawings of which.

MORE DETAILED DESCRIPTION

Figure 1:
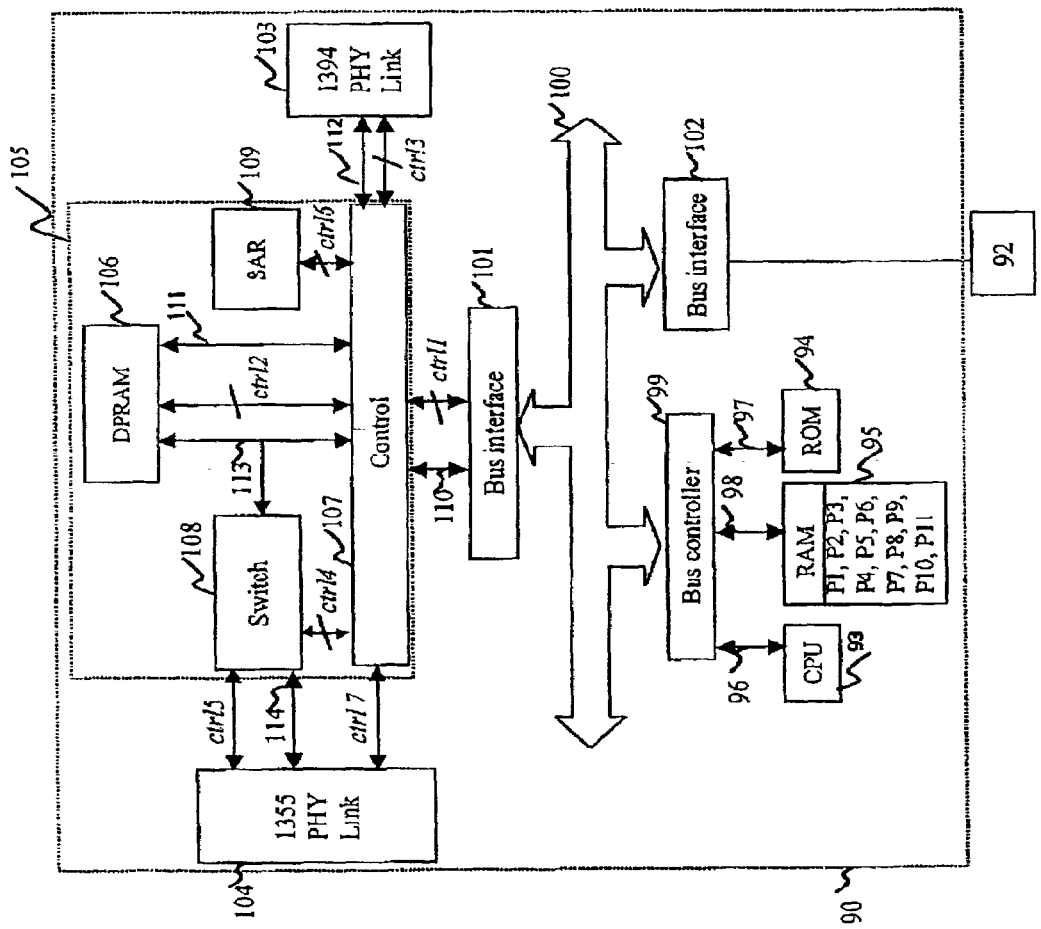
FIG. 1 is a block diagram of a switch according to the invention, according to a particular embodiment.

The invention can be applied in many fields, and can be applied especially in the context of:
- high bit rate switching;
- distributed applications;
- the transmission and/or reception of digital data;
- audio applications;
- company networks, and
- real-time image transmission.

A preferred field of application of the invention is that of domestic applications for high bit rate transfers. Here below, we shall describe an exemplary system implementing the invention, used to interconnect a plurality of audio and video devices in a dwelling.

The standards IEEE 1394 and the IEEE 1355 are respectively adapted to serial communications and to unicast communications.

The system presented here below in the document is a switched bit rate federating network used to achieve high transmission capacities (typically in the range of one Gbit) and meeting the major requirement of interfacing of the two types of standards referred to here above.

The general principle of the invention relies on the implementation:
- of an exchange protocol; and
- an arbitration matrix in a switching module capable of receiving and sending data from several sources, especially through IEEE 1394 and/or IEEE 1355 type interfaces.

The IEEE 1355 type interface has several pairs of input/output ports a pair of FIFOs being associated with each pair of ports.

The IEEE 1394 type interface comprises a DPRAM memory used for the storage of the data coming from and/or addressed to an IEEE 1394 bus.

This DPRAM can also be used for the transfer of data coming from and/or addressed to other communications interfaces.

The switching module, having its architecture organized around two TDM type data buses (one in reception and the other in transmission), comprises especially:
- the arbitration matrix;
- three-state registers driven by signals generated by the arbitration matrix and used for the reading and/or writing of data on the two data buses;
- input FIFOs used for the reception of data coming from a FIFO associated with an IEEE 1355 reception port;
- output FIFOs used for data addressed to the DPRAM for interfacing with the IEEE 1394 bus; and
- internal FIFOs used for the data coming from the DPRAM for interfacing with the IEEE 1294 bus.

The FIFOs are preferably of the dual port memory type and can thus be accessed simultaneously in reading and writing mode on two distinct ports.

The data addressed to an IEEE 1355 transmission port are sent directly to the FIFO associated with this port through the data transmission bus.

According to the data exchange protocols, the operations for the transfer of data between an input or internal FIFO and one or more output FIFOs and/or 1355 ports can be done only in the context of a connection made at the level of the packets. Thus, for a connection to be open, following a request from an input FIFO or an internal FIFO, the destination FIFO or each of the destination FIFOs should enable the opening of one connection. Thus, the destination FIFOs are never saturated.

The arbitration matrix consists of rows and columns.

Each of the columns is associated with an input port and is in charge of the management of the reception of data coming from this input port.

Each of the rows is associated with an output port and is in charge of the management of data intended for this output port.

Naturally, the roles of the rows and of the columns may be exchanged.

The matrix is built in such a way that, as a given point in time, only one crosspoint of each row enables one connection.

In general, the write access to the buses is obtained by means of three-state registers controlled by signals coming from the arbitration matrix.

Furthermore, the arbitration matrix generates control signals for the FIFOs in writing mode.

Thus, in short, the arbitration matrix manages connections between input ports and output ports in preventing conflicts and managing the aspects linked to synchronization. This enables the arbitration matrix to generate control signals for access (in write or read mode) to the transmission and reception buses.

FIG. 1 shows a diagrammatic view of a switching node 90 connected to two serial communications buses conforming to the IEEE 1394 and IEEE 1355 standards.

The node shown in FIG. 1 is also connected to one or more other switching nodes of the switched network to which it belongs.

In the embodiment shown in FIG. 1, it has been chosen to represent a data-processing apparatus 92 also called a peripheral which is associated with the switching device 90.

A switching node comprises;
- a switching device 90;
- a data-processing apparatus 92 associated with the switching device.

As a variant, the data-processing apparatus may itself constitute or include the switching device 90.

The device 90 comprises:
- a central processing unit CPU 93;
- a ROM-type permanent storage means 94, and
- a RAM-type temporary storage means 95 associated with the central processing unit 93, a software architecture being loaded into the means 95 at initialization.

The storage means 95 is able to store data packets of different types, especially:
- asynchronous packets of the type conforming to the IEEE 1394 standard,
- packets constituting messages in non-connected mode (asynchronous messages), of the type conforming to the IEEE 1355 standard,
- control packets of the type conforming to the IEEE 1355 standard,
- stream (isochronous) packets of the type conforming to the IEEE 1355 standard.

The type of packets conforming to the IEEE 1355 standard actually have an existence in the component 104 that will be mentioned later, but they are not stored in this form in the RAM storage means 95. It should be noted that the storage means 95 contain the information necessary to generate the IEEE 1355 packets.

The routing of such packets to the storage means 95 coming either from the 1394 bus or from the switched network constituted by IEEE 1355 links will be described in detail later.

The routing of such packets from the storage means 95 until they are transmitted by the switching node, either to the IEEE 1394 bus or to the switched network consisting of IEEE 1355 links, will be described in detail later.

These three elements 93, 94 and 95 communicate by means of respective data and address buses referenced 96, 97 and 98, with a block referenced 99 and known to those skilled in the as a bus controller.

This block 99 is especially used to exchange data by means of a main bus 100 with at least one bus-interface component 101. Should the bus 100 be a PCI ("Peripheral Component Interconnect") standard bus, the component 101 may be a component referenced AMCC 5933QC, commercially distributed by the company Applied Micro-Circuits Corporation (registered mark).

The bus 100 may also interconnect other elements, not represented in the figure, to one another. These elements are themselves provided with a bus interface and are capable, for example, of implementing data-processing functions.

For example, should the bus 100 be a PCI-standard bus, the block 99 is actually a set of PCI components such as the Intel 440LX AGP set, commercially distributed by the INTEL Company.

Hence, the block 99 comprises, for example, an 82443LX component which provides the interface with the memory 95 via the memory bus 98 and with the central processing unit CPU 93 via the local bus 96. The 82443LX component is itself linked to an 82371AB component which provides an interface with the ISA bus 97 linked to the memory 94. An Intel 82093AA IOAPIC interrupt controller connected to the central processing unit CPU 93 manages the interrupts that may occur in the system.

As shown in FIG. 1, the device 90 also includes a bus interface 102 which may be similar to the bus interface 101, thus allowing the data-processing apparatus or peripheral 92 to access the switching device.

Such an interface is made, for example, in the form of a SEDNET PCI card commercially distributed by the company SEDERTA under the reference SD-PCI-200 and can be used for the connection thereto of any existing data-processing apparatus designed to operate in conformity with the 1394 standard.

It is clearly possible to use an adapter specific to the data-processing apparatus which has to be connected thereto. The adapter 102 essentially comprises an interface component similar to the bus-interface component 101.

Depending on the type of data-processing apparatus, the principal bus 100, as well as the bus-interface component 101 and bus-controller component 99, may be adapted to the architecture of the type of apparatus. The same goes for the set of elements, CPU 93, RAM 95 and ROM 94.

As shown in FIG. 1, the node according to the invention also include, two interfacing means 103 and 104.

The means 103 is intended to provide the interface between the node 90 and the serial communications bus designed to operate according to the IEEE 1394 standard to which the said node is attached.

The interfacing means 103 consists of a set of 1394 PHY/LINK components comprising, for example, a TSB21LV03A PHY component and a TSB12LV01A LINK component which are commercially distributed by Texas Instruments (registered mark), and 1394 standard connectors, for example those marketed by the Company Molex (registered mark), for example under reference 53462.

The interfacing means 103 include at least one external port designed to be connected to a data-processing apparatus or peripheral that is attached to the 1394 serial communications bus.

The means 103 includes means for counting the number of pulses as a function of a clock signal generated by the control module 107 which will be defined later. This clock signal is synchronized with the "Cycle Master" of the serial communications bus with which it is related, by means of packets called cycle-start packets. The frequency of the clock signal generated by the control module 107 is equal to 24 576 MHz+/−100 ppm. This signal is represented as being one of the signals denoted ctrl3 in FIG. 1.

On each serial communications bus of the network, one of the nodes is called the "Cycle Master" and the "Cycle Master" node of the "root" bus is called the "Net Cycle Master".

Moreover, all the "Net Cycle Masters" exhibit a characteristic specific to them, since they depend on the frequency of the internal clock, on the basis of which the duration of one "reference period" or "cycle" is defined.

The duration of the cycle denoted T is equal to an integer number $n_{init}$ of clock pulses that is or is not common to all the buses and is multiplied by the inverse of the frequency of the internal clock specific to the "Cycle Master" node.

The duration of the cycle T is thus equal to 125 microseconds, for example.

When two serial communications buses are linked by a bridge, the "Cycle Master" of one of the buses has to synchronize its cycles with respect to the cycles generated by the "Cycle Master" of the adjacent bus.

Generally, the communications networks formed by serial communications buses allow packet transmission that is synchronized on the basis of the cycles of the buses in question. The buses are, for example, used to transmit audio/video type data packets in real time.

The counting means, such as those of the interfacing means 103 referred to here above, takes for example the form of a register.

The interfacing means 104 mentioned here above consists of an IEEE 1355 interface component with three ports. It has especially a component C113 commercially distributed by the company 4LINKS as well as three interface components LUC1141MK commercially distributed by the company LUCENT (registered trademark). These components are themselves connected to IEEE 1355 connectors, for example commercially distributed by the firm HARTING (registered trademark). The component C113 is itself made out of an FPGA (field programmable gate array) type programmable component, namely a component such as the Spartan XCS30XL commercially distributed by the firm XILINX (registered trademark).

The three external ports of the interfacing means 104 are designed to be connected to ports of the same type on another switching node of the switched network, thus enabling the device 90 to communicate with another node of this network.

The device 90 also has a data flow control means 105 that is used to transfer data between the different interface components 101, 103 and 104. This means 105 is formed by programmable logic means executed by an FPGA type component, for example the component referenced VIRTEX, commercially distributed by the company XILINX.

This means 105 especially implements a dual port storage unit 106 used to store data addressed to or coming from the 1355 standard switched network.

The dual port storage unit has a storage capacity of less than 2 Mbits and is made for example in a form of a 32-bit access DPRAM type memory.

The initials DPRAM refer to "dual port random access memory".

The storage unit 106 has a plurality of memory zones managed as individual FIFO (first-in first-out) type memories.

A memory zone of this kind corresponds to a memory in which the data elements are read in the order in which they are written beforehand.

These memory zones each comprise a read pointer and a write pointer that are associated with each other.

Since each memory zone is managed as a FIFO type memory, its filling and emptying can be done at the same time and independently. This desynchronizes the data read and write operations, performed by a switching unit 108 that will be defined here below, from the data read and write operations performed by the control module 107.

Indeed, the occupancy rate of the memory zone considered is managed circularly and it is known, at all times, whether the data contained in a memory zone have been read or not. When these data have been read, then new data can be written in their place.

The dual port memory unit is, so to speak, a queue for the packets and the storage function is carried out independently, according to the port by which the packets reach the memory unit.

In general, all the isochronous or asynchronous data coming from the switched network is stored in the storage unit 106.

This storage is temporary for the asynchronous data packets (namely packets constituting a message transmitted in non-connected mode) and for the control packets which are then transferred into the RAM storage means 95 for storage for a longer duration.

However, the isochronous data packets (stream type packets, namely packets transmitted in connected mode) are stored only in this storage unit 106 before being transmitted on the communications bus to which the switching node 90 is connected or on the switched network.

This can be explained by the fact that this type of data must be transferred as speedily as possible from the switched network to the bus and must therefore be stored in a storage means that is easily and swiftly accessible.

Similarly, the isochronous data packets that come from the communications bus to which the switching node 90 is connected and that are designed for the switched network, are stored only in the storage unit 106 and not in the storage means 95 for the same reasons as those referred to here above.

Thus, as shown in FIG. 1, the data flow control means 105 comprises several other elements, including a control module 107 (already mentioned here above) that carries out a function of checking the storage unit 106, a switching unit 108 (already mentioned further above) in communication with the interfacing means 104, with the storage unit 106 and the control module 107 as well as a unit for arranging the data packets 109 that is linked to the control module 107.

It will also be noted that the control module 107 communicates with the interfacing means 103 and 104 as well as with the bus interface component referenced 101.

The control module 107 has the function of multiplexing the read or write accesses to registers of other modules from the main bus referenced 100.

The module 107 also controls the bus interface component 101 for the read and write operations on the main bus 100, including especially the burst mode.

The control module 107 is also responsible for activating interruptions on the main bus 100 as a function of particular communications events.

This module exchanges data elements with the component 101 on an additional bus 110 (known as an add-on bus) following the control signs referenced ctrl1.

As indicated here above, the module 107 is responsible for controlling the storage unit 106 with respect to the read and write operations in FIFO mode, in the special case where the bus interface component 101 is an AMCC, by means of a data bus 111 and control signals ctrl2.

The interfacing means 103 contain FIFO type memories used during the transfer of data packets of the type conforming to the IEEE 1394 standard. It has two transmission FIFO memories known as an ATF (asynchronous transfer FIFO) and an ITF (isochronous transfer FIFO) and one reception FIFO memory known as a GRF (general receive FIFO). These FIFO memories are extensively described in the literature associated with the component LINK TSB12LVO1A.

The control module 107 and the interfacing means 103 manage the data transfer on a bus 112 according to the control signals ctrl3.

Furthermore, the control module 107 controls the switching unit 108 by means of control signals ctrl4 in order to transfer data from the switching unit to the storage unit 106 by means of a data bus 113 and vice versa.

The switching unit 108 is connected to the interfacing unit 104 by means of a data bus 114 and control signals ctrl5.

The data packet arranging unit 109, also known as an SAR (segmentation and reassembling) unit, informs the control module 107 of the next data packet or packets to be transmitted by means of control signals ctrl6.

Furthermore, the SAR unit 109 verifies the reception of the data packets and manages the allocation and the releasing of memory zones (known as buffers) of the storage unit 106.

The control signals ctrl7 exchanged between the interfacing means 104 and the control module 107 comprise especially the clock signals regenerated from the reception of the packets 1355 on each of the three ports of the interfacing means 104.

A quartz crystal at 49.152 MHz (not shown) is connected both to the means 104 for the sending of the 1355 standard packets and to the control module 107 which generates a clock signal at 24.576 MHz±100 ppm, firstly for the segmentation and reassembling unit 109 in order to set the rate of the 1355 standard packet transmission and secondly for the interfacing means 103 to set the 1394 standard packet transmission.

Figure 2:
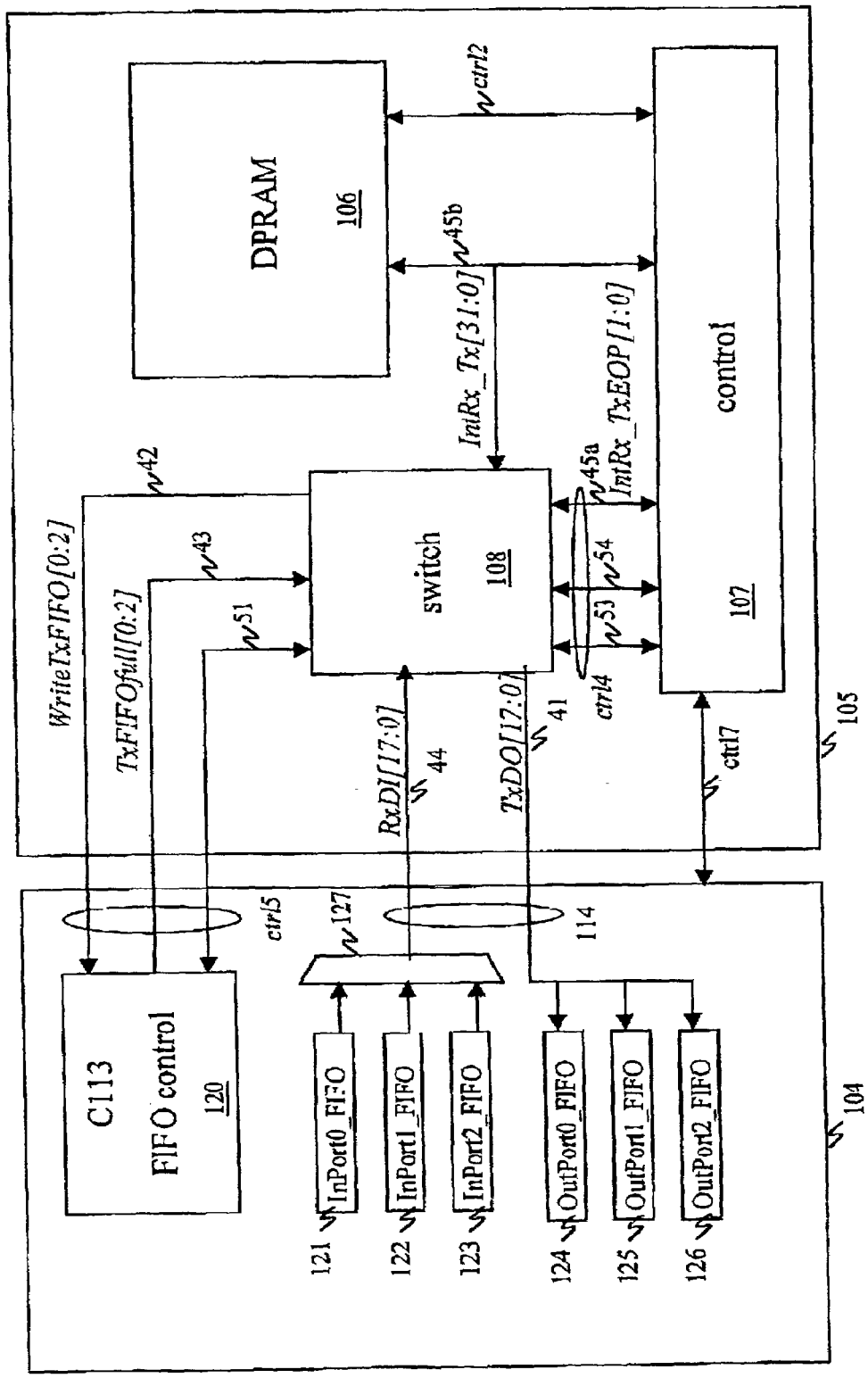
FIG. 2 is a detailed block diagram of a means for the control of data flows, an interface with a serial link belonging to a switch shown in FIG. 1 as well as their interconnections.

FIG. 2 shows a detailed diagrammatic view of the data flux control means 105 and the interface 104 illustrated with reference to FIG. 1 as well as their interconnections.

Some details on the serial interface 104 will provide for an understanding of how the packets are multiplexed on the data bus 114.

The serial interface 104 comprises especially:
FIFO control means 120 described here above with reference to FIG. 1;
three input FIFOs 121 (InPort0_FIFO), 122 (InPort1_FIFO) and 123 (InPort2_FIFO);
a multiplexer 127; and
output FIFOs 124 (OutPort0_FIFO), 125 (OutPort1_FIFO) and 126 (OutPort2_FIFO).

The FIFOs 121, 122 and 123 are used to store incoming packets while the FIFOs 124 to 126 are used to store outgoing packets.

A pair of FIFOs is connected to each port of the IEEE 1355 interface 104. Thus, for example:
the FIFOs 121 and 124 are used for the port 0;
the FIFOs 122 and 125 for the port 1; and
the FIFOs 123 and 126 for the port 2.

The data bus 114 illustrated with reference to FIG. 1 can be subdivided into two houses in FIG. 2:
a bus 44 RxDl[17:0] of links in data reception designed for the switching unit 108 and transmitted by the interface 104; and
a bus 41 TxDl[17:0] of links in transmission of data from the switching unit 108 to the interface 104.

As a variant, the buses 44 and 41 form a single bus.

After they have been written in one of the input FIFOs 121, 122 and 123, the incoming packets are mtultiplexed through the multiplexer 127 before they are sent to the switching unit 108 through the bus 44.

The outgoing data from the switching unit 108 are sent through the data bus 41 to be stored in one of the output FIFOs 124, 125 or 126.

It may be recalled that the data flux control means 105 comprises especially:
the control module 107;
the switching unit 108; and
the dual port memory unit or DPRAM 106.

The control signal Ctrl5 illustrated with reference to FIG. 1 can be broken down into three signals in FIG. 2:
a control signal 51;
a control signal 43 TxFIFOfull[0:2]; and
a control signal 42 WriteTxFIFO[0:2].

The control signals 42 TxFIFOfull[0:2] and WriteTxFIFO [0:2] 43 are used by the control means 120 of the FIFO to manage the transfer of the data packets between the switching unit 108 and a serial link interface 104 through the data buses 44 and 41.

The processing of the control signals in the switching unit 108 will be described further below with reference to FIG. 3.

The signal Ctrl4 illustrated with reference to FIG. 1 between the switching unit 108 and the control module 107 can be subdivided into at least four signals in FIG. 2:
two control signal 53 and 54;
a control signal 45a IntRxTxEOP[1:0];
a data signal 45b IntRx_TX[31:0].

The signal 45b is a data bus connecting the elements 106, 107 and 108. The control module reads the packet headers from this bus 45b.

The control signals 53, 54 and 45a are used for the management of data transfer 45b IntRx_TX[31:0] between the dual port memory 106 and the switching unit 108.

In certain cases, especially during the packet header processing, the data of the packets are sent to the control module 107 rather than to the storage unit 106 for subsequent analysis.

The data bus 45b is shown in FIG. 1 by the data bus 113.

Figure 3:
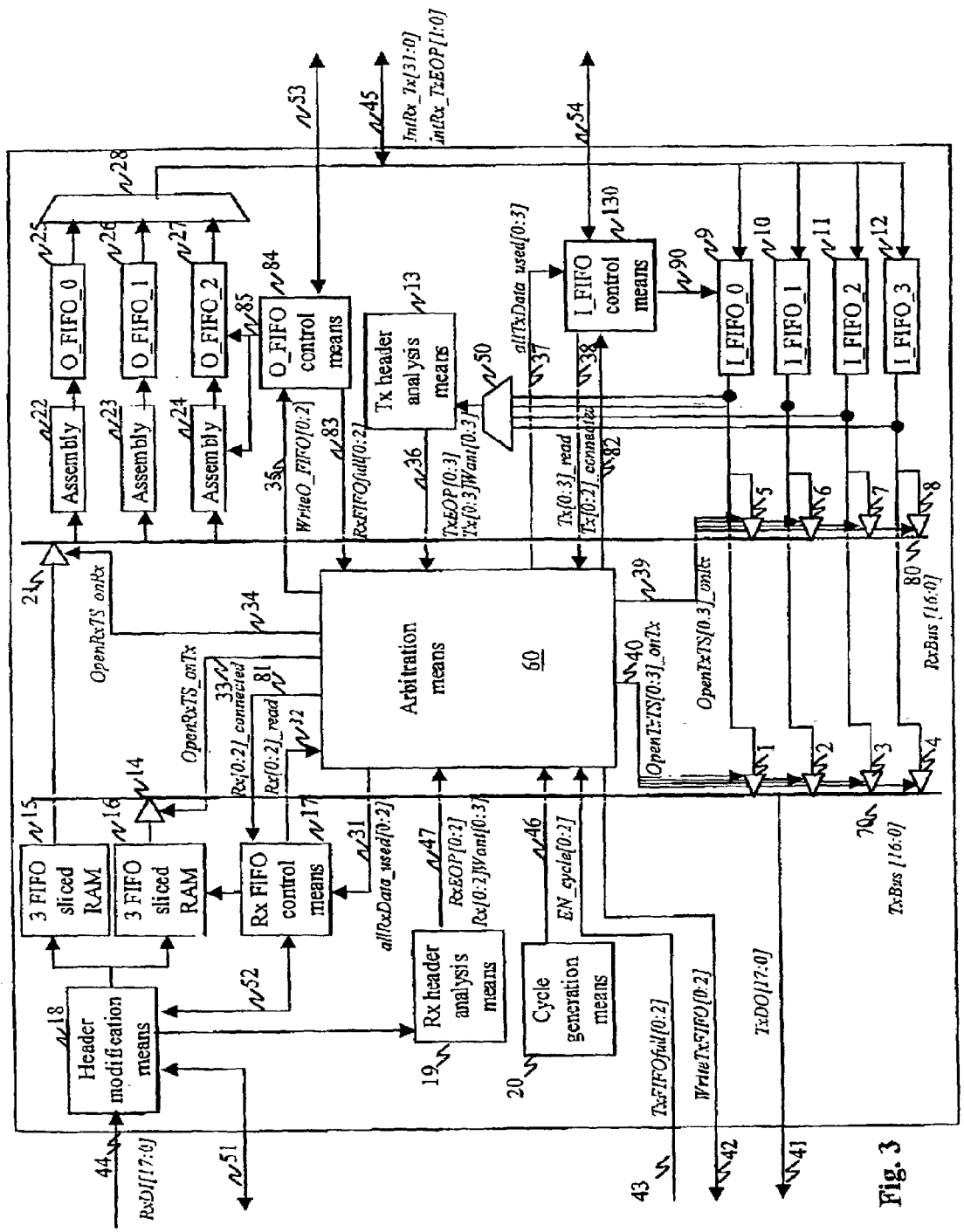
FIG. 3 is an electronic diagram of the switching module of FIG. 2.

FIG. 3 shows an electronic diagram of the switching module 108 of FIG. 2.

The switching module 108 comprises especially:
an arbitration means 60;
a cycle generation means 20;
means responsible for the reception and transmission of data from or to the interface 104 (namely data coming from or addressed to an IEEE 1355 switched network); and
means responsible for the reception of data coming from the DPRAM memory 106 (namely data coming from an IEEE 1394 bus); and
means responsible for sending data to the DPRAM memory 106 (namely data sent to an IEEE 1394 bus).

The means responsible for the reception and sending of data from or to the interface 104 comprise especially:
a header modification means 18;
a means 19 for the analysis of headers at reception;
two reception RAMs 15 and 16 arranged as FIFOs; and
a means 17 for controlling reception FIFOs 15 and 16.

The means responsible for data reception from the memory DPRAM 106 comprise especially:
four input FIFOs 9, 10, 11 and 12;
one means 130 for the control of the input FIFOs;
one multiplexer 50; and
one transmission header analysis means 13.

The means responsible for the transmission of data to the DPRAM memory 106 comprise especially:
three assembling memories 22, 23 or 24;
three output FIFOs 25, 26 and 27;
a means of control 84 of the output FIFOs; and
a multiplexer 28.

These elements, which form part of the switching module 108, are connected by linking elements described here below. It can be seen nevertheless that most of the exchanges are made around the arbitration means 60 with the use of two main data buses TxBus 70 and RxBus 80 whose accesses are managed by the arbitration means 60.

The use of the two internal buses, the transmission bus TxBus 70 and the reception bus RxBus 80 which are used to process the data transfers between the ports shall now be described in detail.

The outgoing packets towards the bus 41 are sent through the transmission bus TxBus 70.

The outgoing packets towards the bus 45 are sent through the internal reception bus RxBus 80.

The arbitration means 60 is responsible for managing write accesses on the bus TxBus 70 controlling the opening:
three-state registers 1, 2, 3 and 4 by means of signals 40 OpenTxTS[0:3]_on Rx for data coming from the input FIFOs 9, 10, 11 and 12; and
three-state registers 14 by means of control signals OpenRxTS_on Rx 33 for the data coming from the memory 16.

The operations of reading of the bus TxBus 70 for writing to an output port of the interface 104 are managed by the arbitration means 60 as a function of the control signal to the FIFOs associated with each port, namely the signal 43 TxFIFOfull[0:2] and the signal 42 WriteTxFIFO[0:2].

The arbitration means 60 also manages the write access towards the bus RxBus 80 in controlling the opening:
of three-state registers 5, 6, 7 and 8 through signals 39 OpenTxTs[0:3]_on Rx for data coming from the input FIFOs 9, 10, 11 and 12; and
a three-state register 21 through the control signals 34 OpenRXTs_on RX for the data coming from the memory 15.

The arbitration means 60 also performs the operations of data reading on the RxBus 80 for writing towards one of the assembly buffers 22, 23 or 24 The assembly buffer is used as a buffer for the conversion of data between the bus 80, on which the data are expressed on 18 bits (16 data bits and 2 check bits) and the 0_FIFOs 25, 26 and 27 in which the data is expressed on 34 bits) (32 data bits and 2 check bits).

These bus sizes are related to physical constraints. The module 84 sends the arbitration means 60 a control signal 83 Rx FIFOfull[0:2], indicating the degree of filling of the FIFOs 25, 26 and 27. The arbitration means 60 generates a control signal 35 WriteO_FIFO[2:0] sent to a control module 84 of the output FIFOs as a function of the degree of filling of the FIFOs 25, 26 and 27

The arbitration means 60 for data multiplexing on the transmission bus TxBus 70 and the reception bus RxBus 80 uses signals 46 with a cycle EN_cycle[0:2]. It is the cycle generation means 20, for example a Johnson counter, that generates these signals 46.

The processing of incoming data shall now be described in detail according to the origin of these data, namely:
the bus 44;
the bus 45.

The incoming data incoming from the bus 44 RxDl[17:0] or the bus 45 will be routed towards the selection switch to go:
towards the bus 41 TXD0[17:0] or towards the bus 44, namely in the direction of the interface 104; or
towards the bus 45, namely in the direction of the DPRAM 106.

The processing of the incoming data from the bus 44 shall now be described.

The data exchanges on the bus 44 are managed through the header modification means 18 and the FIFO control means 120 of the serial interface, by means of the control signals 51. The control signals 51 include a write signal sent towards the header modification means 18 and signals to control the flux, of the means 18, each corresponding to input ports of the interfacing means 104.

The pieces of packets incoming from the bus 44 first of all reach a header modification means 18 for a processing of packet headers.

The pieces of packets are then stored:
in the memory 15 when they are addressed to the reception bus 80 RxBus; and
in the memory 16 when they are addressed to the transmission bus 70 TxBus.

When they are sent to the two buses, the pieces of packets are sent to the two buses simultaneously to be stored in two storage means simultaneously.

Similarly, the reception FIFO control means 17 control the storage operations in two memories 15 and 16.

The memories 15 and 16 are dual port memories subdivided into three independent zones, each managed as a FIFO.

The synchronous signals are managed at a certain rate corresponding to a succession of phases constituted by four clock cycles.

In a four-cycle phase, during each of the first three clock cycles of the phase, both a write operation and a read operation are performed towards two addresses of each of the RAMs (volatile memories) 15 or 16. These addresses respectively point towards:
the last element (tail) of one of the FIFOs in each of the RAMs 15 and 16; and
the first element (head) of one of the FIFOs in each of the RAMs 15 and 16.

No read or write operation towards the RAM 15 and 16 is performed during the fourth clock cycle in a four-cycle phase.

Each effective FIFO read operation (defined when the output signal 32 Rx[i]_read is activated during a cycle and followed by an input signal AllData used[i] activated during a cycle, i corresponding to a number of the input FIFO) modifies the address pointing to the FIFO header.

Effective FIFO write operations (based on the same mechanism as the read operations herein using the signal 52 illustrated with respect to FIG. 3) modify the address pointing to the tail of the FIFO.

Thus, during three cycles, each FIFO part corresponding to each of the input ports is processed: the data writing operations performed by the header modification means 18 are sequentially addressed towards the corresponding parts 15 and 16, each of the pieces of packets entering each of the input ports 121, 122 and 123 of the interface 104.

Similarly, the data elements read from the memories 15 and 16 are processed respectively by the buses RxBus 80 and TxBus 70.

The reception FIFO control means 17 is responsible for the reading and effective writing of the FIFOs contained in the memories 15 and 16.

The control signal 52 informs the header modification means 18 that a FIFO is full in one of the memories 15 or 16 and that there is also a write request for a FIFO in one of the memories 15 or 16.

The reception FIFO control means informs the arbitration module 60 that a new data element has been read from one of the memories 15 or 16 through the signal 32 Rx[0:2] read.

The same data elements are read at each four-cycle phase when they are not read effectively by placing them simply, either on the bus RxBus or on the bus TxBus or on both of the buses as a function of the routing of the packet.

Thus, the same data elements are presented every four cycles until they have been really read by the destination or destinations.

The arbitration means 60 manages the opening of the three-state register 14 through the control signals 33 Open-RxTs_onTx to place the pieces of data that have been read of the memory 16 on the transmission bus TxBus 70.

The means 60 also manages the opening of the three-state register 21 through the control signals 34 OpenTxTs_onRx to place the pieces of data that have been read of the memory 15 on the reception bus RxBus 80.

The arbitration means 60 also manage the control of the signals allRxdata_used[0:2] to inform the control means 17 of the reception FIFOs that the next data element will be read on a corresponding part in one of the memories 15 or 16.

The received packet header analysis means 19 control the shape of the signal 47 towards the arbitration means 60.

When a new packet coming from one of the input ports 121, 122 or 123 is processed by the header modification means 18, the signal 47 Rx[02]Want[0:3] enables the request of a connection:
to one of the output ports of the interface 104 through the multiplexed bus 41; or
to one of the internal FIFOs 25, 26 or 27 through the multiplexed bus 45.

When the end of the packet is processed by the header modification means 18, the signal 47 RxEOP[0:2] informs the arbitration means 60 of the end of a connection.

It will be noted that the header modification means 18 sends a signal representing a piece of routing information to the reception header analysis means 19.

With respect to connection and disconnection towards the IEEE 1355 serial interface, the arbitration means 60 manages the signals 81 Rx[0:2]_connected sent to the reception FIFO control means 17 to indicate the status of the connection associated with each port.

Similarly, the arbitration means 60 manages the signals 82 Tx[0:2]_connected to the control means 130 of the input FIFOs 9, 10, 11 and 12 for the data coming from the DPRAM 106.

The data exchanged on the bus 45 are managed:
- by means 84 for the control of the output FIFOs 0_FIFO and the control module 107 by means of the signal 53; and
- by the means 13 for the control of the input FIFOs I-FIFO and the control module 107 by means of the signal 54.

The multiplexer 28 authorizes the selection of an output FIFO 0_FIFO among the three FIFOs 25, 26 or 27 for operations of reading FIFOs containing data intended for the dual port storage memory 106. This selection operation is managed by the output FIFO 0_FIFO control means 84 through a signal 85.

Furthermore, the input FIFO I_FIFO control means 130 control write operations of the storage memory 106 at one of the four input FIFOs I_FIFO referenced 9, 10, 11 or 12 through the signals 90.

This is only the case for the bus 42 where the control signals 43 and 42 attached to the storage means of the output ports are directly connected to the arbitration means 60.

In other words, the bus 41 is the only bus whose control signals (42 and 43) are directly connected to the arbitrator 60.

The processing of incoming data from the bus 45 shall now be described in detail.

The packet pieces coming from the bus 45 are demultiplexed towards each input FIFO 9, 10, 11 and 12. Thus, four packets (one per input FIFO) can be processed simultaneously.

Each input FIFO is connected to two internal buses 70 and 80 through the three-state registers 1 to 8.

The arbitration means 60 is responsible for managing:
- the write access on the bus TxBus 70 alternately controlling the opening of the three-state registers 1 to 4 through the signals OpenTxTs[0:3]_onTx referenced 40, each of the registers 1 to 4 being assigned to an input FIFO 9 to 12; and
- the write access on the bus RxBus referenced 80 alternately controlling the opening of the three-state registers 5 to 8 though the signals 39 OpenTxTs[0:3]_onRx each of the registers 5 to 8 being assigned to an input FIFO 9 to 12.

The write operations of the bus RxBus 70 are independent of the write operations on the bus TxBus 80.

The arbitration means 60 also generate control signals 37 allTxData used[0:3] that permit the reading on one of the input FIFOs 9 to 12 through the control means of the input FIFO 130.

The control means 130 of the input FIFOs informs the arbitration means 60 of the success of a read operation performed by one of the input FIFOs through the control signal Tx[0:3]_Read referenced 38

The packet header data elements are multiplexed by a multiplexer 50 of one of the output FIFOs 9 to 12 to be sent to the header analysis means 13.

The transmitted packet header analysis means 13 analyzes the data coming from the input FIFOs 9, 10, 11 and 12 to generate the signal 36 Tx[0:3] Want[0:3] sent to the arbitration means 60.

When a new packet is processed in one of the input FIFOs 9 to 12, the signal 36 Tx[0:3] Want[0:3] enables the request of a connection:
- to one of the output ports of the interfacing means 104 by a multiplexed bus 41; and
- to one of the output FIFOs 25, 26 or 27 through a multiplexed bus 45.

When the end of the packet is processed in one of the input FIFOs 9 to 12, the signal 36 TxEOP[0:3] is used to inform the arbitration means 60 of an end of connection.

Figure 4:
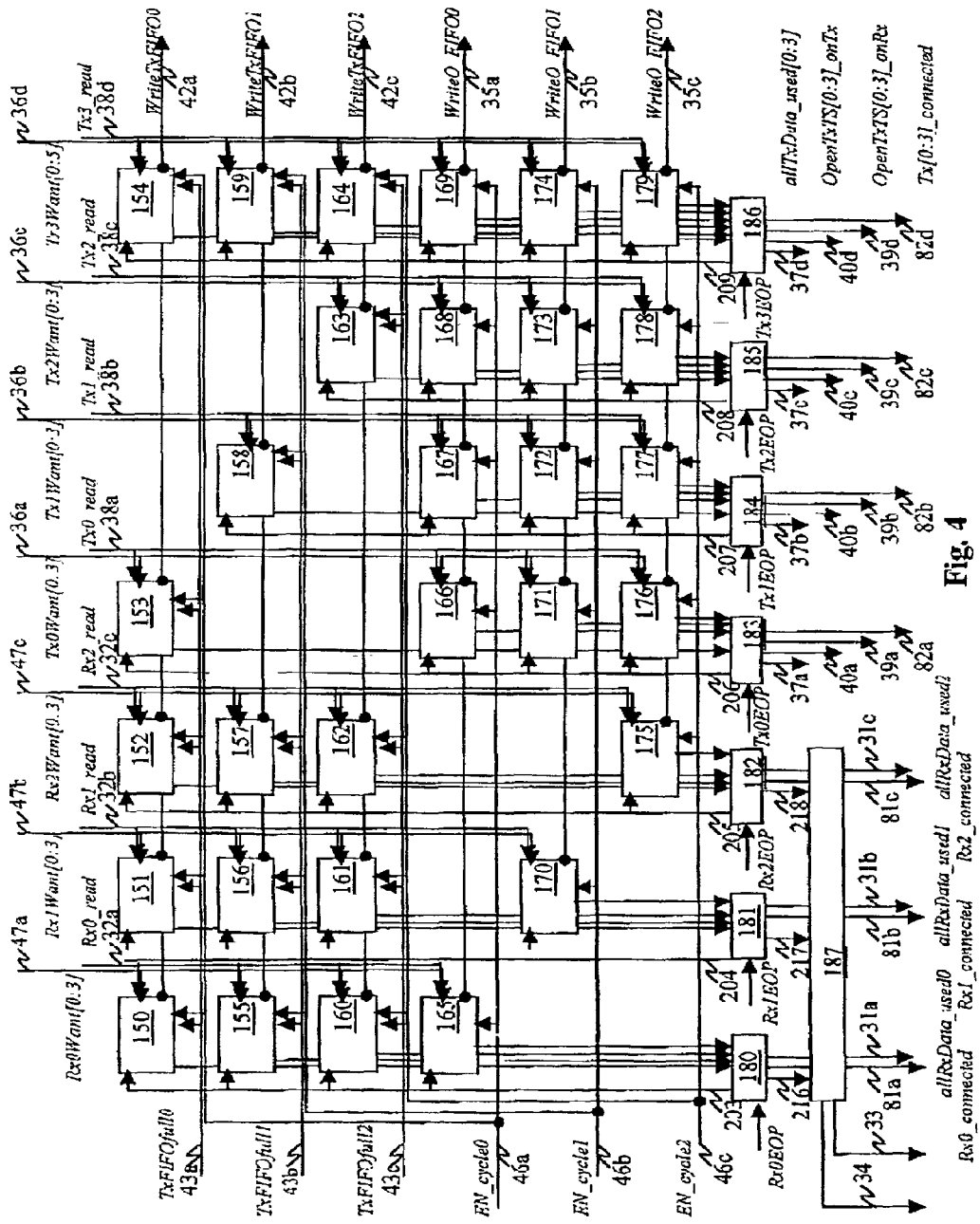
FIG. 4 is an electronic diagram of an arbitration means (or switch matrix) present in the module of FIGS. 2 and 3.

FIG. 4 illustrates a detailed implementation of the arbitration means 60. The arbitration means is in charge of the generation of the time division multiplexing in combination with the connection management. Here, a connection refers to a slot allocated to a routing packet from an incoming port to an outgoing port.

A connection cycle is associated with each outgoing port. The establishment of a connection associates an incoming port with at least one connection cycle and validates the mechanism of writing protocol data units for each piece of elementary data to the outgoing port associated with the connection cycle or cycles considered.

The key element of the arbitration means 60 is an elementary crosspoint.

In the preferred embodiment, the arbitration means 60 especially comprises:
- 30 elementary crosspoints as illustrated, with reference to FIG. 4 and referenced 150 to 179; and
- seven central crosspoint processing means 180 to 186 performing OR type operations on elementary signals; and
- one processing means 187 performing OR type operations on elementary signals.

The thirty elementary crosspoints 30 are organized in rows and columns. The columns process signals attached to incoming ports while the rows process signals attached to the outgoing ports.

A column is allocated to each input FIFO or in an equivalent way to each incoming packet:

Thus, the first, second and third columns correspond to three FIFOs made out of dual port memories 15 and 16 as shown with reference to FIG. 3), respectively attached to the FIFOs InPort0_FIFO 121, InPort1_FIFO 122 and InPort2_FIFO 123 of the serial interface 104.

Similarly, the 4th, 5th, 7th and 8th columns are respectively attached to the input FIFOs I_FIFO_0 9, I_FIFO_1 10, I_FIFO_2 11 and I_FIFO_3 12.

A row is allocated to each output FIFO or in an equivalent way attached to each outgoing packet:

Thus, the first, second and third rows correspond to three output FIFOs OutPort0 FIFO 24, OutPort1 FIFO 125 and OutPort2 FIFO 126 with the serial interface and attached to the time slots of the bus TxBus 70.

Similarly, the 4th, 5th, 6th rows correspond to the internal output FIFOs of the switch, respectively the FIFOs O_FIFO_0 25, O_FIFO_1 26 and O_FIFO_2 27 attached to the time slots of the bus RxBus 80.

The slots available for he connection pertain to rows (hence to output ports), which means that it is possible to process six connections simultaneously. So long as a crosspoint has been selected with a row, the corresponding time slot or the corresponding output FIFO are allocated to an incoming packet. Thus, no other packet can be transmitted during this time slot while the existing connection remains active, until the end of transfer of the current packet.

To obtain such behavior, the elementary crosspoints on a row are daisy-chained so as to provide for only one connection at a time. For example, the elementary crosspoints 150 to 154 are daisy-chained to enable the transfer of only one incoming packet during the slot 0 of the bus TxBus 70. Similarly, the elementary crosspoints 165 to 169 are daisy-chained to enable the transfer of only one incoming packet during the slots 0 of the bus RxBus 80. These daisy-chaining operations are described in detail with reference to FIG. 5.

According to the preferred embodiment, an incoming packet may be transferred simultaneously on four slots when the arbitration matrix comprises four elementary crosspoints per column distinct from the last column.

The last column transfers packets to all the slots simultaneously and the arbitration matrix includes six elementary crosspoints associated with this last column. This last column corresponds to the special implementation of the broadcasting FIFO 1_FIFO_3 12.

According to one particular embodiment of the switch, a simplified arbitration matrix eliminates pairs of elementary crosspoints and, for example, when the bus 45 is attached to an internal point, the crosspoints 166 to 169, 171 to 174 and 176 to 179 are no longer useful because they will be used only for the traffic generated by the internal point for itself.

According to the preferred embodiment, for each column signalling, the input signals 471*a* to 471*c* and 47*a* to 47*c* (Rx[0:2]EOP and Rx[0:2]Want[0:3]) and 361*a* to 361*d* and 36*a* to 36*d* (Tx[0:2]EOP and Tx[0:2]Want[0:3]) inform each elementary crosspoint of the same column respectively of the end of the transfer of a packet (release of the connection) or of a new packet to be transferred (connection request).

It can be noted that the input signals 361*a* to 361*d* and 36*a* to 36*d* (as illustrated with reference to FIG. 3 under reference 36) are generated by the transmission header analysis means upon reception of an end-of-packet marker (EOP).

The input signals 32*a* to 32*c* (Rx[0:2] read) and 82*a* to 82*d* (Tx[0:2]_read) inform each elementary crosspoint of the same column of the availability of a new elementary piece of data to be processed during the connection cycle determined beforehand during the setting up of this connection.

The signals 471*a* to 471*c* and 47*a* to 47*c* are generated by the reception header analysis means 19 as illustrated with reference to FIG. 3 and the reference 47 upon reception of an end of packet marker (EOP).

The signals 32*a* to 32*c* and 38*a* to 38*d* are generated respectively by the reception FIFO control means 17 and the input FIFO control means 130 as illustrated with reference to FIG. 3 under the respective references 32 and 38.

Each column is associated with one of the central crosspoints 180 to 186. Thus, for example, the column comprising the elementary crosspoints 150, 155, 160 and 165 is associated with the central crosspoint 180.

Each of the processing means 180 to 186 performs an OR type operation on the control signal generated for each slot corresponding to the column that is associated with it and for each bus (respectively on the buses TxBus 70 and RxBus 80) corresponding to each connection cycle.

An output signal 203 to 209 coming from each central crosspoint respectively 180 to 186 is connected with each crosspoint of the column corresponding to the crosspoint considered and enables the validation of the effective writing of the protocol unit on to the outgoing port associated with the connection cycle considered.

The output signals 203 to 209 respectively represent the signals:
   OpenRxTs0_onTx[0.2] and Rx0_EOP_sent (203);
   OpenRxTs1_onTx[0:2] and Rx1_EOP_sent (204);
   OpenRxTs2_onTx[0:2] and Rx2_EOP_sent (205);
   OpenTxTs0_onTx[0:2] and Tx0_EOP_sent (206);
   OpenTxTs1_onTx[0:2] and Tx1_EOP_sent (207);
   OpenTxTs2_onTx[0:2] and Tx2_EOP_sent (208); and
   OpenTxTs3_onTx[0:2] and Tx3_EOP_sent (209).

The means 187 perform an OR type operation (represented by the sign □) on the output signals 216 to 218 (in complying with the specific implementation of the FIFOs present in the dual port memories 15 and 16) of the central crosspoints 180 to 182 that correspond to the first three columns of the arbitration matrix.

Thus, for example, a piece of elementary data present in one of the FIFOs of the RAM 15 is presented on the bus RxBus 80 when one of the signals OpenRxTs0_onRx[0:2] activates the opening of the three-state register 21 associated with the FIFO of the memory 15. Since all three FIFOs of the memory 15 associated with the FIFO InPort0_FIFO 121, InPort1_FIFO 122 and InPort2_FIFO 123 are done from the dual port memory 15 associated with the bus RxBus 80, a single three-state register 21 is needed between respectively the memory 15 and the bus RxBus 80. It is therefore enough for one of the signals OpenRxTS[0:2]_onRx[0:2] to be valid to turn the three-state register 21 on. The register 21 is therefore controlled by the signal OpenRxTS_onRX 34 generated by the means 187 according to the following relationship:

OpenRxTS_onRx=OpenRxTS0_onRx[0:2] □
       OpenRxTS1_onRx[0:2] □ OpenRxTS2_onRx
       [0:2]

Similarly, a single three-state register 14 between the memory 16 and the bus TxBus 70 is controlled by the signal OpenRxTS_onTx 33 generated by the means 187 according to the following relationship:

OpenRxTS_onTx=OpenRxTS0_onTX[0:2] □
       OpenRxTS1_onTx[0:2] □
       OpenRxTS2_onTx[0:2]

The means 187 also generates output signals 31*a*, 31*b*, 31*c*, 81*a*, 81*b* and 81*c* and is connected to the reception control means 17 RxFIFO.

The output signals 37*a* to 37*d* and 82*a* to 82*b* respectively corresponding to the 4th, 5th, 6th and 7th columns are connected to the input FIFO control means 130. The output signals 40*a*, 40*d* respectively control the three-state registers 1 to 4 and the output signals 39*a* and 39*d* respectively control the three-state registers 5 to 8 illustrated with reference to FIG. 3.

For the signalling of the rows, input signals chiefly including time slots enable cycles 46*a*, 46*b* and 46*c* that validate the connection cycles:
   for any writing on the output FIFOs respectively 124, 125 or 126 through the bus TxBus 70; or
   for the writing on the internal FIFOs 25, 26 and 27 through the bus RxBus 80.

It will be noted that, during one and the same time slot, a write operation can take place simultaneously on an output FIFO and on an internal FIFO.

An internal FIFO must be constantly available for writing in order to comply with a high speed of the bus 45 while the output FIFO may sometimes cope with congestion on the network. This is why each of the, 1st, 2nd and 3rd rows also include a complete FIFO signalling 43*a*, 43*b* or 43*c* of the output FIFOs respectively 124, 125 and 126. All the input signals connected to a row are connected to each elementary crosspoint with this row. The output signals resulting for each row 42a to 42c and 35a to 35c are generated by a simple elementary crosspoint with their corresponding row, this row having previously gained a connection with the row.

Figure 5:
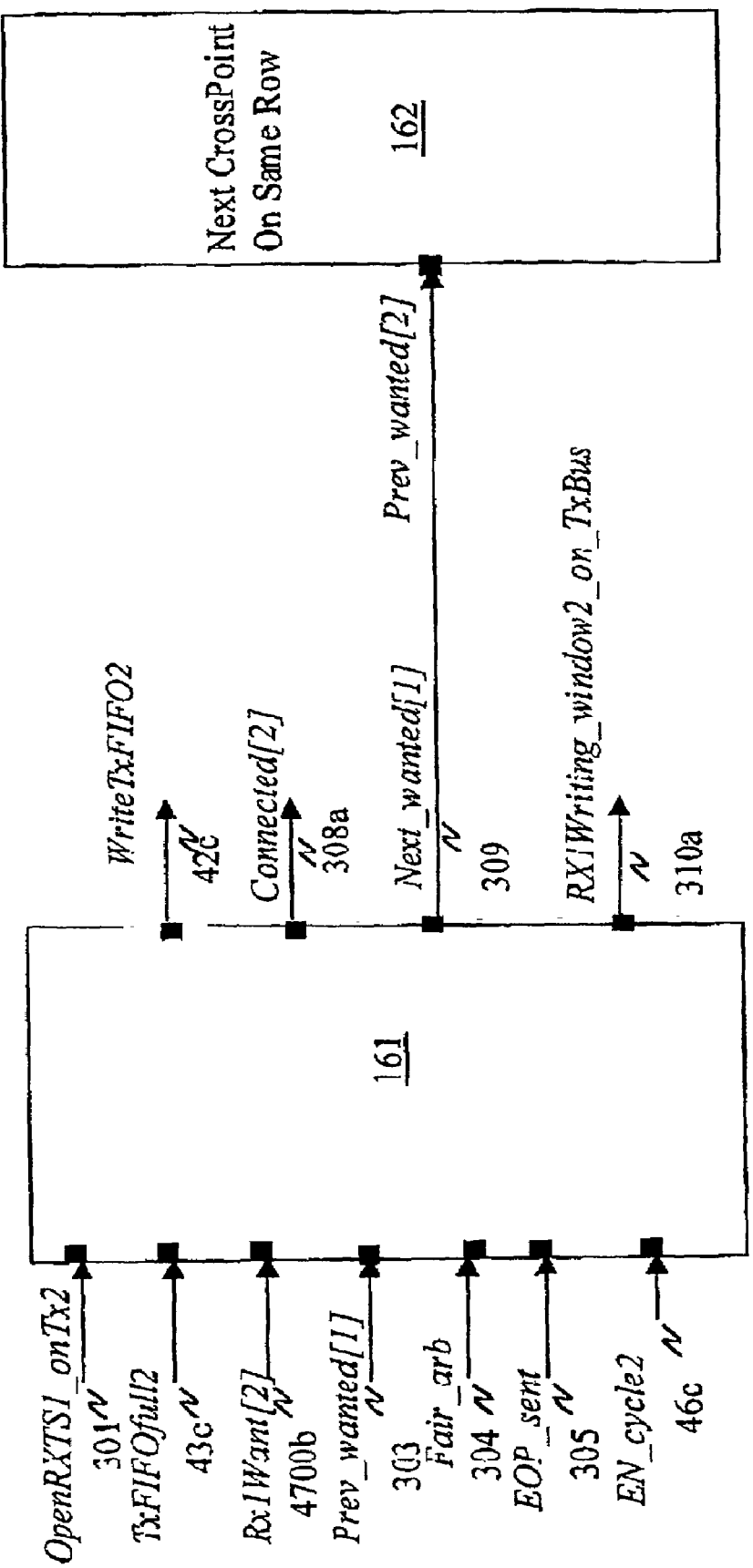
FIG. 5 describes a crosspoint of the switch matrix of FIG. 4.

FIG. 5 gives a detailed view of the connections of an elementary crosspoint 161 facing FIG. 4, the other elementary crosspoints being connected in a very similar way.

The crosspoint 161 corresponds to the arbitration means associated with a connection of the input FIFO 122 and of the output FIFO 126 as illustrated with reference to FIG. 2.

The crosspoint 161 is responsible for the generation of the signals needed for the central crosspoint 181 illustrated in FIG. 4 as a function of the arbitration results.

For the management of the connections, the crosspoints uses signals 4700b, 303, 304 and 305 at input while it generates signals 308a and 309.

The signal 309 is daisy-chained at input of the next crosspoint of the same row (namely the point 162) while the signal 303 comes from the previous crosspoint of the same row (namely the point 160).

The signal Rx1Want2 4700b is one of the signals 47b of FIG. 4 indicating the request status for the connection between the input FIFO 122 and the output FIFO 126.

The signal Prev_wanted[1] gives the current status of the availability of a slot facing the other challenger input FIFOs of the same row.

The signal Fair_arb 304 is used as an option to give a priority level of the arbitration during the daisy-chaining.

The signal EOP_sent 305 (which herein is Rx1EOP_sent in particular as shown in FIG. 5 but can also more generally represent one of the signals Rx[0:2]_EOP_sent or Tx[0:3] EOP_sent) comes from a central crosspoint 181 used for the releasing of a connection as soon as the last piece of data of a current packet has been transmitted from an input FIFO 122 to selected output FIFOs of the second column.

The signal Connected[2] 308a synchronously informs the central crosspoint 181 of the result of the arbitration of the current connection corresponding to the crosspoint 161 while the signal Next_wanted[1] is daisy-chained with the crosspoint 162 to enable this arbitration.

To manage the time distribution multiplexing implying a crosspoint 181, the elementary crosspoint 161 generates a signal RX1Writing_window2_on_Txbus referenced 310a while it receives, from the same central crosspoint, a signal OpenRXTS1_on_Tx2 301, a signal EOP_sent 305 using also a time slot allowing for a cycle EN_cycle2 46c and a FIFO full status information for the output FIFO 126 through a signal TxFIFOfull2 43c.

The crosspoint 161 is also responsible for generating the writing of a signal WriteTxFIFO2 42c designed for the output FIFO 126.

Figure 6:
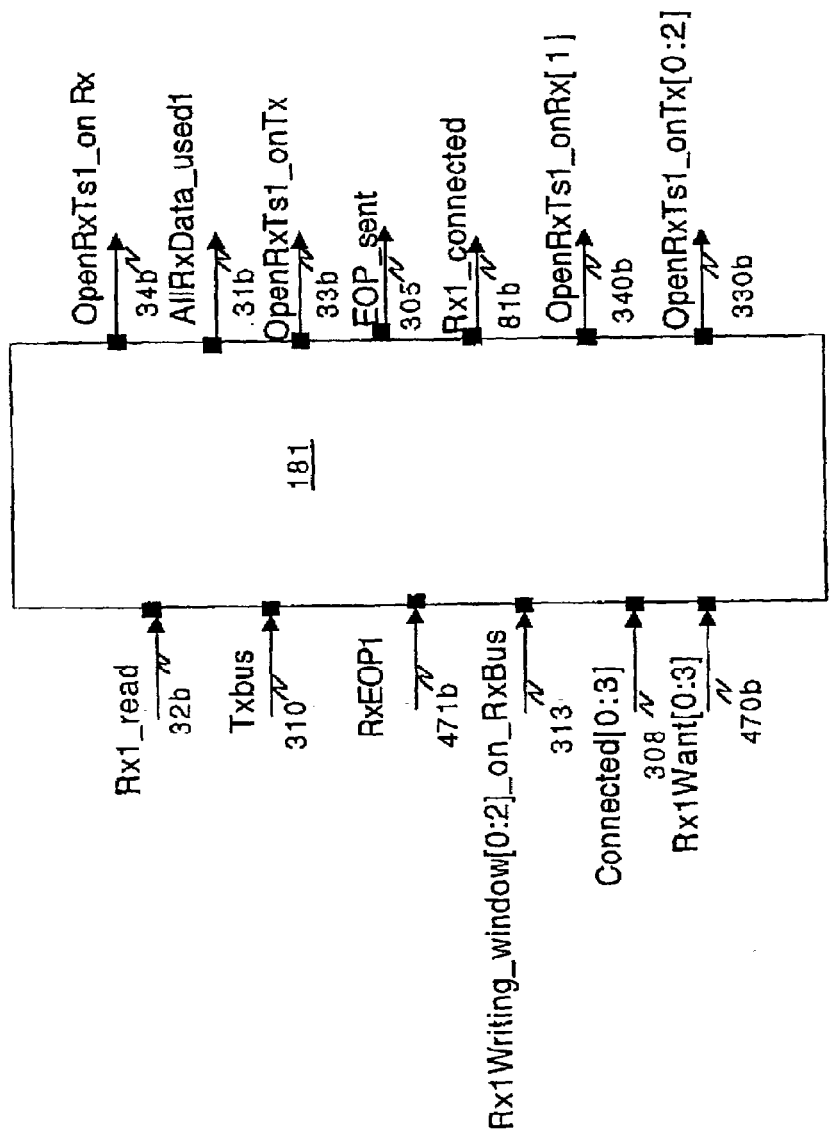
FIG. 6 presents a central crosspoint governing a column of the switch matrix of FIG. 4.

FIG. 6 shows a central crosspoint 181 of the 2nd column as shown with reference to FIG. 4, the other control crosspoints being quite similar.

The crosspoint 181 is responsible for managing the time division multiplexing associated with the transfer of all the packets of the input FIFO 121.

It first of all receives all the slot reservation status reports from the arbitration results of the elementary crosspoints (151, 156, 161 and 170) by using a signal Connected[0:3] 308 and the associated requests for the transfer of input FIFOs 122 using a signal Rx1Want[0:3] 470b that belongs to the signal Rx[0:2]Want[0:3] generated by the module 20 illustrated with reference to FIG. 3.

It also receives, from the same central crosspoints, write requests on the output FIFOs pertaining to slot reservations:

Rx1Writing_window[0:2]_on_Rxbtus 313; and
Rx1Writing_window[0.2]_on_Txbus 310.

The central crosspoint also receives the signal Rx1_read 32b coming from the module 17 of the FIFO reception control means illustrated in FIG. 4, and activated whenever a read operation is performed on a FIFO associated with the incoming port 1.

The central crosspoint 161 generates a signal Rx1_connected 81b towards the reception FIFO control means 17 of FIG. 3 used to indicate if all the output FIFOs selected have been successfully reserved in the slot reservation step.

When the connections are available for all the output FIFOs desired, the central crosspoint generates control signals OpenRxTs1_onTx[0:2] 330b and OpenRxTS1_onRx[1] 340b that are concatenated by an OR type operation to generate a signal opening a three-state register and associated with the transfer that follows, between an input FIFO 122 and selected output FIFOs (OpenRxTS1_on_Rx 34b for the bus RxBus and OpenRxTS1_on_Tx 33b for the bus TxBus).

The signals OpenRxTS1_on_Rx and OpenRxTS1_on_Tx coming from the central crosspoints (180, 181 and 182) 34b and 33b are respectively concatenated by an OR type operation in order to generate control signals 33 OpenRxTS_ onTx and 34 OpenRxTS_onRx 34 respectively opening the three-state registers 14 and 21 controlling the access to the buses TxBus and RxBus of FIG. 3

The central crosspoint 181 gives each elementary crosspoint of the same column the signals 330b OpenRxTS1_onTx[0:2], 340b OpenRxTS1_onRx[1]. The crosspoint 161 then simply receives the signal 301 OpenRxTS1_onTx[2] of FIG. 5.

Whenever a piece of data is sent to a selected output FIFO, a central crosspoint 181 activates a signal AllRxData_ usedl 31b to reception FIFO control means in order to modify the read address of the memory 15 and 16 of FIG. 3.

From the reception header analysis module 20 of FIG. 3, the crosspoint 181 receives information on the last piece of data read of the current packet to be transmitted to the selected output FIFOs in using a signal RxEOPl 471b.

When this piece of data is transmitted, the crosspoint 181 activates a signal EOP_sent to all the elementary crosspoints of the same column in order to release the reservation of the time slots corresponding to the packet.

Figure 7:
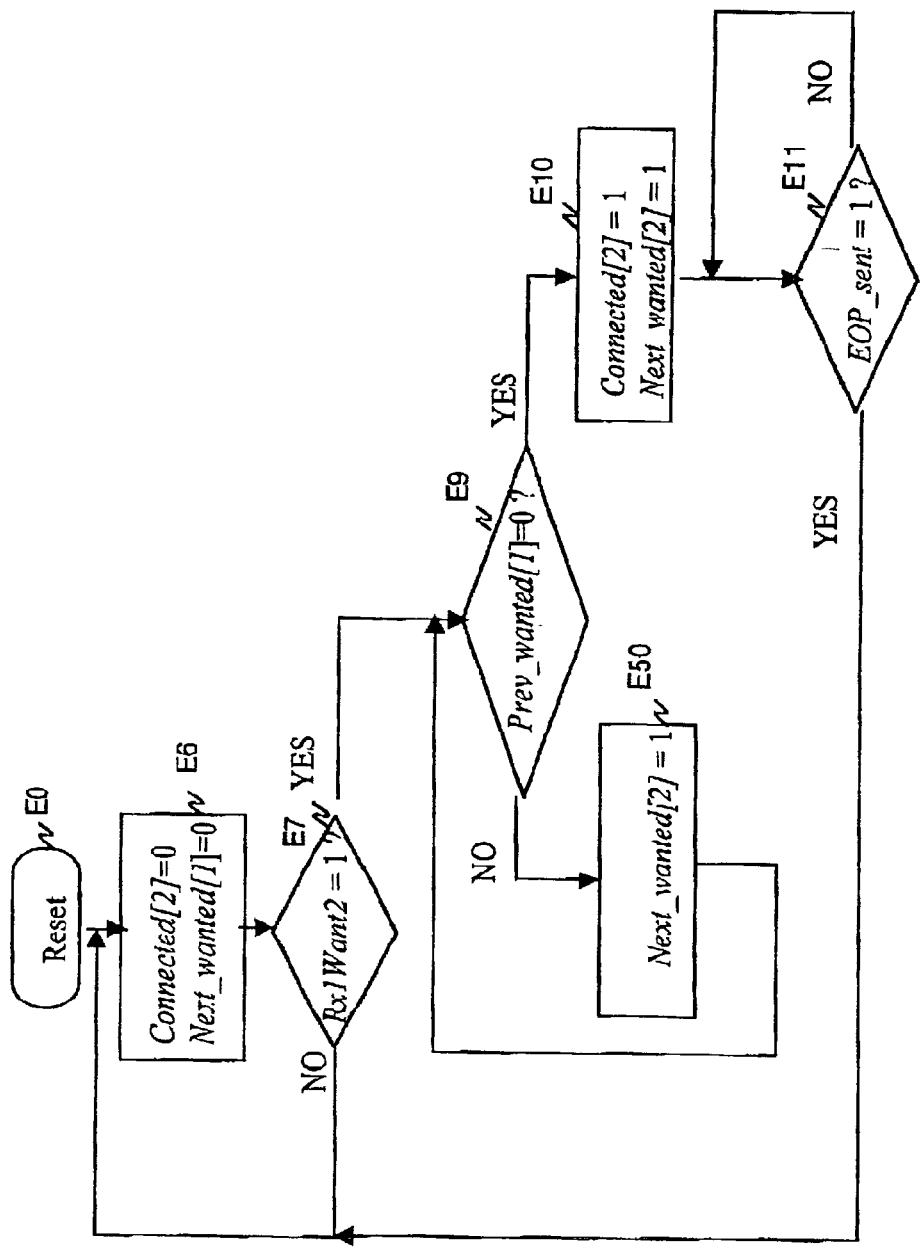
FIG. 7 illustrates an arbitration algorithm in a crosspoint present in the switch matrix of FIG. 4.

FIG. 7 illustrates an arbitration algorithm in an elementary crosspoint 161, this crosspoint affecting the management of the connection between an input FIFO 122 and an output FIFO 126 as illustrated with reference to FIG. 2.

After an initialization or reset step E0, during a rest step E6, the signals Connected[2] and Next_wanted[1] are reset at a logic level equal to zero, indicating an availability of slots for a connection between another input FIFO (different from the FIFO 122) and the output FIFO 126.

Then, in a step E7, a test is performed on the status of the signal Rx1Want2 indicating whether a connection request is active between the FIFOs 122 and 126. The step E7 remains active up to the occurrence of a new request (namely up to the activation of the signal Rx1Want[2] at a level 1).

After the occurrence of this request, during a step E9, a test is performed on the signal Prev_Wanted[1].

If the signal Prev_Wanted[1] is equal to 1 (signifying that the connection is already required by an input FIFO) during a step E50, the signal Next_Wanted[2] is set at a logic level equal to 1, thus propagating the state of the connection after up to the next crosspoint. Then, the step E9 is reiterated.

If, during the step E9, the signal Prev_Wanted[1] (which, it may be recalled, gives the current status of the availability of a slot with respect to the other challenger input FIFOs of the same row) is equal to zero (thus signifying that connection is possible) during a step E10, the two signals Connected[2] and Next_Wanted[2] are set at a logic level equal to 1 and the connection is then reserved throughout the transfer of the packet of the input FIFO 122 to the output FIFO 126 as illustrated with reference to FIG. 2.

Then, during a step E11, the arbitration means 60 wait for the signal EOP_sent, which corresponds to the indication of end of packet transfer, to be placed in a state equal to 1.

Then, when the signal EOP_sent is effectively equal to 1, the step E6 is reiterated in order to enable a release of the connection for subsequent requests.

Figure 8:
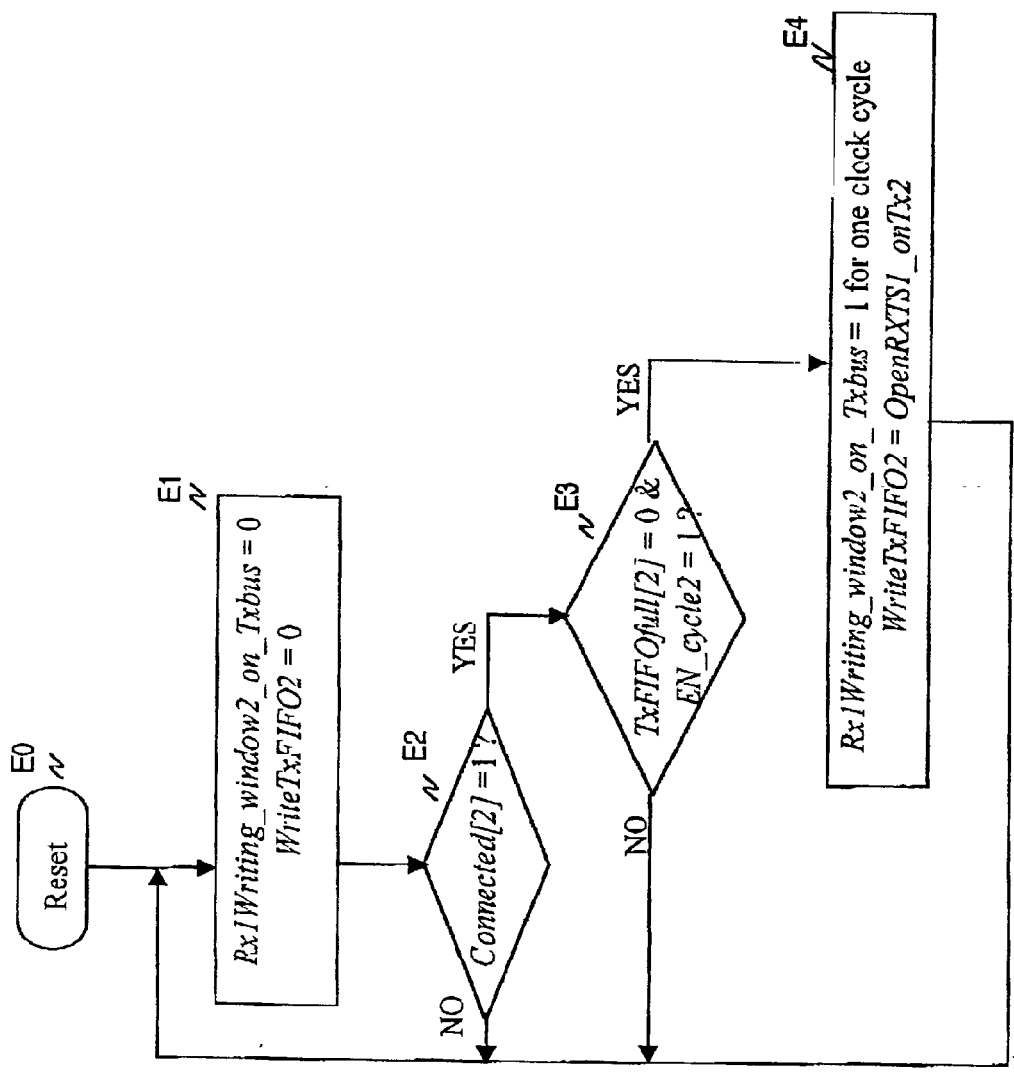
FIG. 8 illustrates a time division multiplex algorithm in a crosspoint present in the switch matrix of FIG. 4.

FIG. 8 illustrates a multiplexing algorithm in a crosspoint present in the switching matrix of FIG. 4. It illustrates especially the flow of data as implanted in the elementary crosspoint 161 in order to obtain, in a central crosspoint 181, a junction of the time division multiplex as a function of the connections involving the incoming FIFO 122.

After an initialization step (E0)) during a step E1, the signals Rx1Writing_window2_on_Txbus and WritexFIFO2 are reset at a zero logic level.

Then, a test E2 is performed on the signal Connected[2] which indicates the status of the connection.

If the signal Connected[2] is equal to zero (meaning that no connection is active) the step E1 is reiterated.

If the signal Connected[2] is equal to 1, a connection is activated. A test E3 is then performed on the signals TxFIFOfull[2] and EN_cycle2.

The signal EN_cycle2 oscillates permanently at a frequency equal to the frequency of a quarter cycle and is allocated simultaneously to both connections involving the output FIFO 126 of FIG. 2 and the output FIFO 27 O_FIFO_2 of FIG. 3 each respectively associated independently with the bus TxBus 70 and the bus RxBus 80.

The signal TxFIFOfull[2] indicates the filling status of the output FIFO 126.

During the test E3, if at the same time the signal TxFIFOfull[2] is not equal to zero and if the signal EN_cycle2 is not equal to 1, the step E1 is reiterated.

In other cases, during a step E4,
 the signal Rx1Writing_window2_on_Txbus is set as a logic level equal to 1; and
 the signal WriteTxFIFO2 is set at a level equal to that of the input signal OpenRXTS1_onTx2 for a clock cycle.
Then, the step E1 is reiterated.

Figure 9:
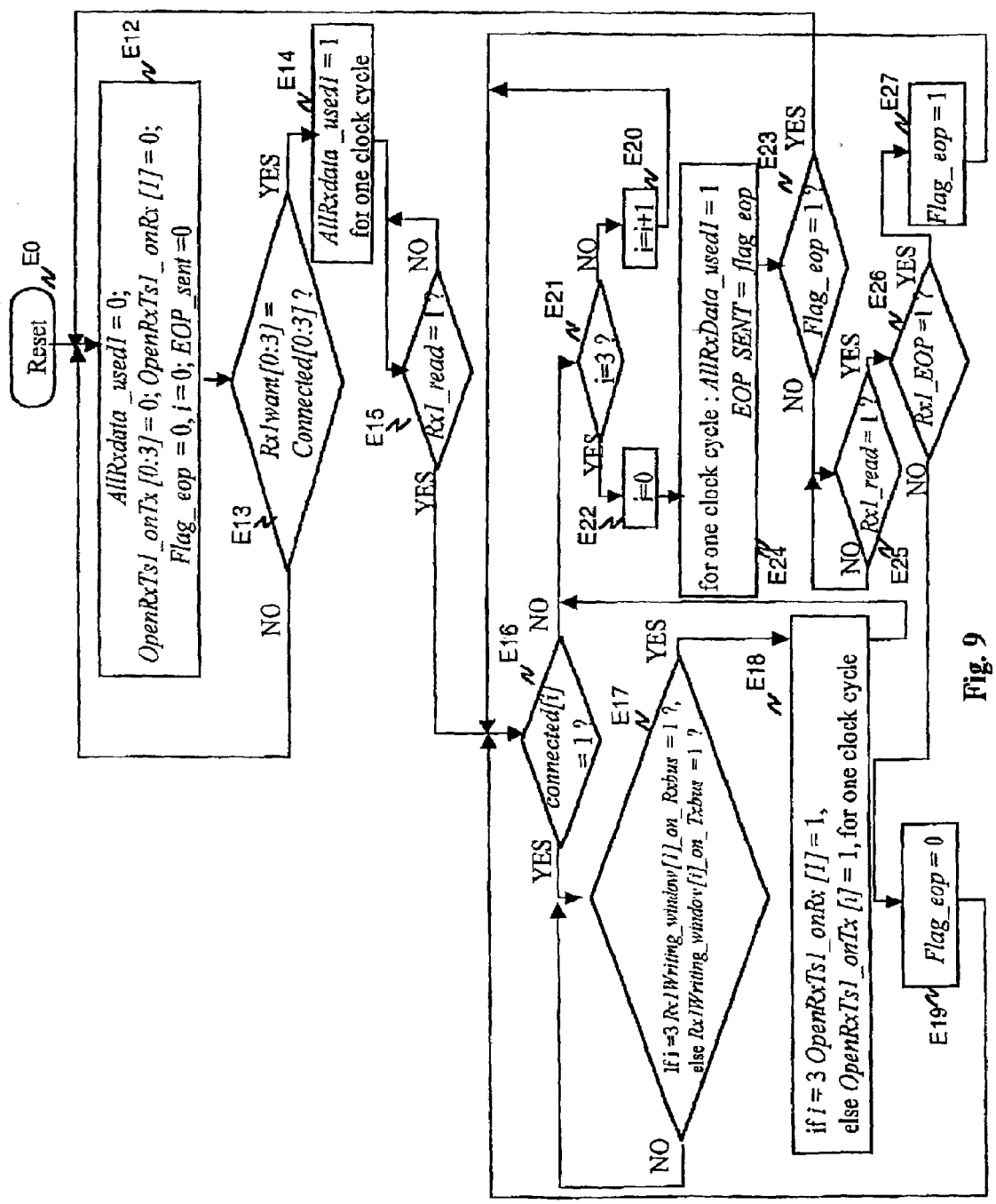
FIG. 9 illustrates a time division multiplex management algorithm in a central crosspoint present in the switch matrix of FIG. 4.

FIG. 9 illustrates an algorithm laid out inside the central crosspoint 181 of the 2nd column, illustrated with reference to FIG. 4.

After an initialization step (step E0) during a step E12, the following signals are set in the logic level 0:
 AllRxdata_usedl;
 OpenRx1_onTx[i] for a variable i ranging from 0 to 3;
 OpenRxTs_onRx[1]; and
 Flag EOP.

The index i indicates the possible number of connections between an input FIFO 122 and output FIFOs. This number is incremented at each first possible connection of the considered column of the matrix of FIG. 4 starting with the top row. For the 2nd column, a value equal to 3 is assigned to the output FIFO 26 O_FIFO_1 of FIG. 3.

Then, in a step E13, a test is performed to ascertain that all the connection applications have succeeded (in this case Rxwant[0.3] is equal to the signal Connected[0:3]).

If this is not the case, the step E12 is reiterated.

If all the connection requests have succeeded, during a step E14, the signal AllRxdata_usedl is set at the logic level 1 during a clock cycle, in order to validate the reading of a piece of elementary data in the memories 15 and 16 of FIG. 4 associated with the input FIFO 122.

Then, during a step E15, there is a wait for the signal Rx1_read to be equal to 1.

When the signal Rx1_read is equal to 1, a loop beginning at the step E16 is started.

This loop ensures that, for the connection set up, each piece of data read from the input FIFO 122 is transferred to the selected output FIFOs.

During the test E16, the arbitration means 60 finds out whether the signal Connected [i] is equal to 1.

If this is not the case, the signal Connected [i] of 1 equals zero, corresponding thus to an absent connection. During a step E21, the value of the index i is compared with 3.

If the index i is not equal to 3, during a step S20, the index i is incremented by a value equal to 1 and the step E16 is reiterated.

If during the step E21 the index i is equal to 3, during a step E24 the signal AllRxData_usedl is set at 1 while the signal EOP_sent takes the value of the signal Flag_eop during a clock cycle.

Then, during a step E23, a test is performed on the internal signals Flag_eop.

The signal Flag_eop is used to enable the transmission of the last data of a current packet on all the active connections while an indication of a last piece of data read is generated by the module 19 illustrated with reference to FIG. 3.

If, during the step E23, the signal Flag_eop is equal to 1, the connections are released and the step E12 is reiterated.

If, during the step E23, the signal Flag_eop is equal to zero, during a step E25 a test is performed on the signal Rx1_read corresponding to the availability of a new data element to be transferred to the output FIFOs.

So long as the signal Rx1_read is not equal to 1, the operation E25 is reiterated.

When the signal Rx1_read is equal to 1, during the step E26 a test is performed on the signal Rx1_eop.

If the signal Rx1_eop is equal to 1, during a step E27, the signal Flag_eop is put in the logic state 1 (to enable the storage of the indications of the last data element to be transmitted to the output FIFOs). Then the step E16 is reiterated.

During the step E26, if the signal Rx1_eop is equal to zero, during a step E19, the signal Flag_eop is reset in the logic state zero. Then the step E16 is reiterated.

If during the step E16, the signal connected[i] is equal to zero, during a step E17 a test is performed as a function of the value of the index i;
 if the index i is equal to 3, the test E17 is performed on the signal Rx1Writing_window[1]_on_Rxbus (corresponding to the triggering window for the transfer of data to the output FIFO O_FIFO_1 26);
 if the index i is not equal to 3, the test is performed on the signal RxWriting_window[i]_on_Txbus (corresponding to the value of the triggers for the transfer of data to the output FIFOs 124, 125 or 126 as a function of the value of the index i).

In any case, the step E17 is performed so long as the relative tested signals are equal to 1.

When the tested signal is equal to 1, a step E18 is performed as a function of the value of the index i:
 if the index i is equal to 3, the signal OpenRxTS1_on_Rx [1] is set at a logic level equal to 1 during a clock cycle;

else, the signal Open_TxTS1_on_Tx[i] is set in the logic state equal to 1 during a clock cycle.

Then, the step E21 is performed.

In parallel, the output signal OpenRxTs1_on_Rx is set at a value equal to that of the signal OpenRxTs1_on_Rx1.

At the same time, the signal Open_RxTs1_on_Tx1 and Open_RxTs1_on_Tx2 are added up (the OR function in Boolean logic) to generate an output signal OpenRxTs1_on_Tx.

These output signals are again summed up (not shown) in the arbitration module 60 illustrated with respect to FIG. 3 to respectively generate signals OpenRxTs_on_Rx and Open_RxTs_on_Tx.

Figure 10:
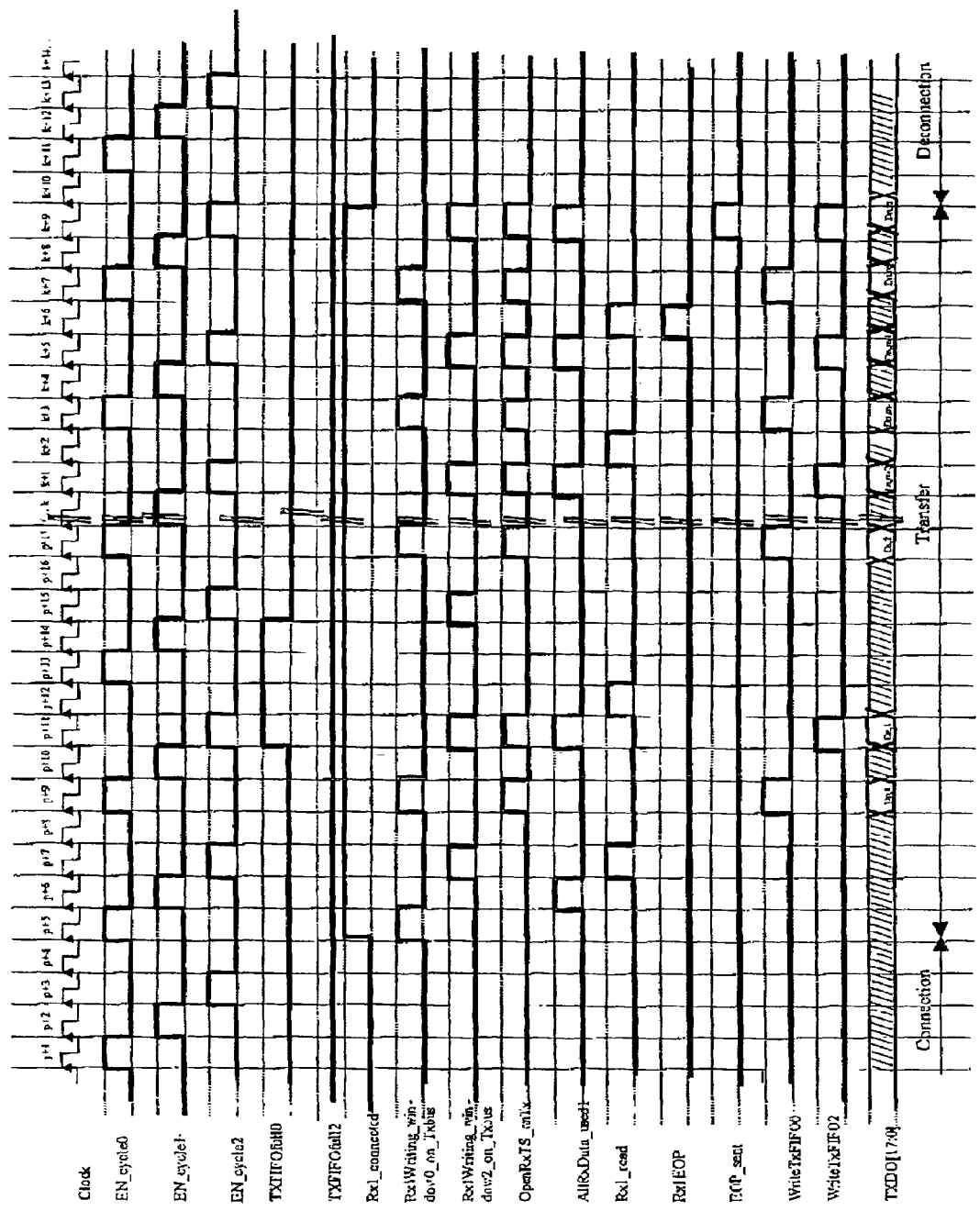
FIG. 10 shows a timing diagram of the signals conveyed between FIFOS of the switching module of FIG. 2.

FIG. 10 describes a timing diagram of the management of the TDM performed by the central crosspoint 181 of FIG. 4 when a packet is transferred from an input FIFO 122 to output FIFOs 124 and 126. The packet is labelled with a value n and its length is equal to m, corresponding to the number of pieces of elementary data.

The clock cycles are indicated with references p to p+17 and k to k+14, the passage between p+17 and k represented by the sign "//" symbolizing a duration of variable length that is not specified in detail.

The timing diagram shows the three phases of a communications process corresponding to a connection cycle:
  a connection phase;
  a transfer phase; and
  a disconnection phase.

The connection phase ends at the cycle p+4 when the signal Rx1_connected becomes active, thus indicating the success of a slot reservation for the output FIFOs 124 and 126.

In FIG. 10, the requests and daisy-chaining signals are not shown.

The transfer phase begins as soon as the connection phase is ended. The "triggering" windows (or possible write cycle towards a FIFO associated with an output port) are then validated (Rx1Writng_window0_on_Txbus for the output FIFO 124 and Rx1Writing_window2_on_Txbus for the output FIFO 126). It is noted that a possible write cycle in a FIFO is especially conditioned by the state of this FIFO (for example the signal TxFIFOfull[0:2] indicating that the FIFO or FIFOs are full).

The signal ALLrxDate_used1 is active during the cycle p+6 to force the reading or a first data element Dn,1 on the memory pertaining to the input FIFO 122 by activation of the signal Rx1_read during the cycle p+7.

When the first piece of data Dn,1 is read, the signal Open_RxTs_on_Tx takes the same values as the triggering window throughout the transfer phase of the first piece of data and is activated in parallel with the write signals on the output FIFOs (signals WriteTxFIFO0 and WriteTFIFO2).

Thus, when the signal Rx1Writing_window_on_Txbus is activated during the cycle p+9, a writing of the first piece of data Dn,1 takes place on the output FIFO 124. Similarly, when the signal Rx1Writing_window2_on_Txbus is activated during the cycle p+11, a writing of the first piece of data Dn,1 takes place on the output FIFO 122. It is noted that these operations of writing the data Dn,1 are performed during a phase of four elementary cycles referenced p+9 to p+12.

When a writing takes place on each of the output FIFOs (herein during the cycle p+11), the signal AllData_used1 is activated during a cycle (p+11), thus awaiting the occurrence of validity of the signal Rx1_read during the cycle p+12 enabling the transfer of new data.

From the cycle p+11 up to the cycle p+14, the FIFO 124 is full (the signal TXFIFOfullO is then equal to 1) then invalidating the triggering window relative to the output FIFO 124 during at least four cycles.

During the cycle p+12 (signal Rx1_read activated), a new data element Dn,2 is read from the FIFO type memory but is not transmitted pending the availability of a new time slot for a following connection (herein the following connection of the triggering window indicated by the validity of the signal Rx1Writing_window0_on_Txbus)

The transfer interruption ends at the cycle p+15.

On the cycle k+6, the last piece of data of the packet Dn,m is read from the input FIFO 122. The transfer phase then ends when this data element Dn,m is transmitted to the output FIFOs 124 and 126 after a cycle k+9 while the signal EOP_sent is active.

The disconnection phase is immediately performed on the involved crosspoints (151, 161 and 181) and the signal Rx1_connected is released for the future connections.

Naturally, the invention is not limited to the embodiments mentioned here above.

In particular, those skilled in the art will be able to make any variant in the definition of the architecture of the switching device capable of comprising, especially, several IEEE1394 type or IBEE1355 type interfaces or not comprising either of the IEEE1394 or IEEE1355 type interfaces.

It will also be noted that the invention is not limited to switching devices as such but can be extended to any apparatus carrying out an appropriate switching function to perform multicast packet transmission operations during a connection cycle.

It will also be noted that the invention can be applied to the following fields:
  high bit rate switching;
  distributed applications;
  digital data transmission;
  digital data reception;
  audio applications;
  company networks; and
  real-time image transmission.

It will be noted that the invention is not limited to a purely hardware layout but it can also be implemented in the form of a sequence of instructions of a computer program or any form combining a hardware part and a software part. Should the invention be laid out partially or totally in software form, the corresponding sequence of instructions can be stored in a detachable storage means (for example a floppy disk, a CD-ROM or a DVD-ROM) or otherwise, this storage means being partially or totally readable by a computer or a microprocessor.

What is claimed is:

1. A protocol data unit switching method used for the selective interconnection of a transmitter port and a plurality of receiver ports selected from among at least two receiver ports by means of at least one internal bus, said protocol data units being constituted by at least one elementary piece of data, wherein the method comprises:
  a synchronization mechanism defining time slots, called connection cycles, on said internal bus;
  a mechanism for the allocation of at least one of said connection cycles to each of the selected receiver ports; and
  a mechanism for the writing of at least one piece of elementary data in the allocated connection cycle or cycles so as to enable the broadcasting of the protocol data unit to said selected receiver ports, wherein said writing mechanism comprises a verification step determining whether all the elementary pieces of data constituting a current protocol data unit have been received by each of the selected receiver ports, and wherein writing of at least one elementary piece of data belonging to another protocol data unit to any one of the selected receiver ports is blocked until all the selected receiver ports have received all the elementary pieces of data constituting the current protocol data unit.

2. A method according to claim 1, wherein said writing mechanism is reiterated for any not-yet-serviced selected receiver port, so long as all the elementary pieces of data constituting the current protocol data unit have not been received by said not-yet-serviced selected receiver port.

3. A method according to claim 1, wherein said allocation mechanism comprises a step of association of each of said connection cycles to each of said selected receiver ports.

4. A method according to claim 1, wherein said allocation mechanism comprises:
  a step for the detection of a transmitter port requesting the transfer of at least one protocol data unit towards at least one selected receiver port;
  a step for verifying that the selected receiver port or ports are ready to receive the protocol data unit or units; and
  a step for the validation of at least one connection cycle used for the writing of the elementary data of the protocol data unit or units in the selected receiver ports during the validated connection cycle or cycles when the verification is positive.

5. A method according to claim 1, further comprising:
  multiplexing on at least one input bus the elementary pieces of data coming from a plurality of transmitter ports and addressed to a first subset of the at least two receiver ports; and
  multiplexing on at least one output bus the elementary pieces of data coming from said plurality of transmitter ports and addressed to a second subset of the at least two receiver ports.

6. A method according to claim 1, wherein transmitter and receiver ports are organized in pairs each combining a transmitter port and a receiver port, each pair being associated with a distinct link.

7. A method according to claim 1, further comprising at least one link connected to said transmitter port and/or to said receiver ports.

8. A method according to claim 7, wherein the link belongs to the group comprising:
  IEEE 1355 or equivalent links; and
  external buses.

9. A method according to claim 1, wherein said writing mechanism comprises at least one step for the writing of each piece of elementary data of each of said protocol data units, each of said steps for writing each piece of elementary data comprising:
  a sub-step for the acceptance, by each of said selected receiver ports, of the writing of each piece of elementary data to be transmitted; and
  a sub-step for the transmission of said each piece of elementary data to be transmitted, to each of said selected receiver ports.

10. A method according to claim 9, wherein during said acceptance sub-step, the acceptance is conditioned by a degree of filling of a reception memory associated with said selected receiver port, for each of said receiver ports.

11. A method according to claim 1, wherein said writing mechanism comprises at least one step of arbitration for at least one bus connecting a set of at least one input port comprising said transmitter port to a set of at least one output port comprising said receiver ports, said arbitration step being carried out by a switching matrix consisting of crosspoints capable of managing the transmission of elementary data between an input port and an output port, and being organized in rows and columns,
  each column, or row respectively, being capable of managing the reception of elementary data coming from an input port associated with the column, or row respectively; and
  each row, or column respectively, being capable of managing the transmission of elementary data to an output port associated with the row, or column respectively;
  so that a single crosspoint per row, or column respectively, at a given point in time, can enable the transmission of elementary data.

12. A method according to claim 1, wherein each protocol data unit transmitted comprises at least one routing header and wherein the method further comprises:
  at least one step for the analysis of said routing header, and/or
  at least one step for the modification of said routing header.

13. A protocol data unit switching device which selectively interconnects a transmitter port and a plurality of receiver ports selected from at least two receiver ports by means of at least one internal bus, said protocol data units being constituted by at least one piece of elementary data, wherein the device comprises:
  a synchronization unit which defines time slots, called connection cycles, on said internal bus;
  an allocation unit which allocates at least one of the connection cycles to each of the selected receiver ports; and
  a writing unit which writes at least one piece of elementary data in the allocated connection cycle or cycles, so as to enable the broadcasting of the protocol data unit to the selected receiver ports,
  wherein said writing unit comprises a verification unit determining whether all the elementary pieces of data constituting a current protocol data unit have been received by each of the selected receiver ports,
  and wherein writing of at least one elementary piece of data belonging to another protocol data unit to any one of the selected receiver ports is blocked until all the selected receiver ports have received all the elementary pieces of data constituting the current protocol data unit.

14. A device according to claim 13, wherein said writing unit is activated for any not-yet-serviced selected receiver port, so long as all the elementary pieces of data constituting the current protocol data unit have not been received by said not-yet-serviced selected receiver port.

15. A device according to claim 13, wherein said allocation unit associates each of said connection cycles to each of said selected receiver ports.

16. A device according to claim 13, wherein said allocation unit performs:
  detection of a transmitter port requesting the transfer of at least one protocol data unit towards at least one selected receiver port;
  verification that the selected receiver port or ports are ready to receive the protocol data unit or units; and
  validation of at least one connection cycle used for the writing of the elementary data of the protocol data unit or units in the selected receiver ports during the validated connection cycle or cycles when the verification is positive.

17. A device according to claim 13, further comprising:
at least one input bus multiplexing the elementary pieces of data coming from a plurality of transmitter ports and addressed to a first subset of the at least two receiver ports; and
at least one output bus multiplexing the elementary pieces of data coming from said plurality of transmitter ports and addressed to a second subset of the at least two receiver ports.

18. A device according to claim 13, wherein transmitter and receiver ports are organized in pairs, each combining a transmitter port and a receiver port, each pair being associated with a distinct link.

19. A device according to claim 13, further comprising at least one link connected to said transmitter port and/or to said receiver ports.

20. A device according to claim 19, wherein the link belongs to the group comprising:
IEEE 1355 or equivalent links; and
external buses.

21. A device according to claim 13, wherein said writing unit writes each piece of elementary data of each of said protocol data units, and:
accepts, by each of the selected receiver ports, of the writing of said each piece of elementary data to be transmitted, and
transmits said each piece of elementary data to be transmitted, to each of the selected receiver ports.

22. A device according to claim 21, wherein the acceptance implemented by said writing unit is conditioned by a degree of filling of a reception memory associated with the selected receiver port, for each of said receiver ports.

23. A device according to claim 22, wherein said reception memory comprises at least one FIFO.

24. A device according to claim 13, wherein said writing unit arbitrates at least one bus connecting a set of at least one input port comprising said transmitter port to a set of at least one output port comprising said receiver ports, the arbitration step is carried out by a switching matrix consisting of crosspoints capable of managing the transmission of elementary data between an input port and an output port, and organized in rows and columns,
each said column, or row respectively, being capable of managing the reception of elementary data coming from an input port associated with the column, or row respectively; and
each said row, or column respectively, being capable of managing the transmission of elementary data to an output port associated with the row, or column respectively;
so that a single crosspoint per row, or column respectively, at a given point in time, can enable the transmission of pieces of elementary data.

25. A device according to claim 13, wherein each protocol data unit transmitted comprises at least one routing header and the device further comprises:
at least one unit for the analysis of said routing header; and/or
at least one unit for the modification of said routing header.

26. A device according to claim 13, further comprising an interfacing unit for delivering, to a control module and through a clock signal transmission unit, clock signals regenerated from packets received by said interfacing unit.

27. A device according to claim 13, further comprising an interfacing unit for transmitting and/or receiving information through at most two connection buses addressed to and/or coming from at least one of the means belonging to the group comprising said synchronization unit, said allocation unit and said writing unit.

28. A device according to claim 27, wherein the protocol data units sent out by at least one emitter port towards FIFOs are multiplexed by a reception linking bus.

29. A device according to claim 27, wherein the protocol data units received by at least one receiver port through the FIFOs are demultiplexed on a transmission linking bus.

30. A switching apparatus comprising:
at least one switching device according to claim 13; and
at least one element belonging to the group comprising:
IEEE 1355 or equivalent links, and external buses.

31. A switching apparatus according to claim 30, connected to a data processing apparatus.

32. A method according to claim 1, wherein the method is applied to at least one of the fields belonging to the group comprising:
high bit rate switching;
distributed applications;
the transmission of digital data;
the reception of digital data;
audio applications;
company networks; and
real-time image transmission.

33. A computer program stored on a computer-readable medium, the program executing a protocol data unit switching method used for the selective interconnection of a transmitter port and a plurality of receiver ports selected from at least two receiver ports by means of at least one internal bus, said protocol data unit being constituted by at least one elementary piece of data, the program comprising:
a synchronization step defining time slots, called connection cycles, on the internal bus;
an allocation step for the allocation of at least one of the connection cycles to each of said selected receiver ports; and
a writing step for the writing of at least one piece of elementary data in the allocated connection cycle or cycles so as to enable the broadcasting of the protocol data unit to said selected receiver ports, said writing step comprising a verification step determining whether all the elementary pieces of data constituting a current protocol data unit have been received by each of the selected receiver ports, and writing of at least one elementary piece of data belonging to another protocol data unit to any one of the selected receiver ports being blocked until all the selected receiver ports have received all the elementary pieces of data constituting the current protocol data unit.

34. A method according to claim 11, wherein at least one column, or row respectively, of said switching matrix comprises at least two crosspoints each associated with a different receiver port, so that at a given point in time a same piece of elementary data can be transferred to the at least two receiver ports associated with said at least two crosspoints.

35. A method according to claim 34, wherein the switching means comprises N receiver ports, and wherein at least one column, or row respectively, of said switching matrix comprises N crosspoints each associated with one of the N receiver ports, so tat at a given point in time a same piece of elementary data can be transferred to the N receiver ports.

36. A device according to claim 24, wherein at least one column, or row respectively, of said switching matrix comprises at least two crosspoints each associated with a different receiver port, so that at a given point in time a same piece of elementary data can be transferred to the at least two receiver ports associated with said at least two crosspoints.

37. A device according to claim 36, wherein the switching means comprises N receiver ports, and wherein at least one column, or row respectively, of said switching matrix comprises N crosspoints each associated with one of the N receiver ports, so that at a given point in time a same piece of elementary data can be transferred to the N receiver ports.

* * * * *

UNITED STATES PATENT AND TRADEMARK OFFICE
CERTIFICATE OF CORRECTION

| | |
|---|---|
| PATENT NO. | : 7,177,307 B2 |
| APPLICATION NO. | : 10/055939 |
| DATED | : February 13, 2007 |
| INVENTOR(S) | : Frouin et al. |

It is certified that error appears in the above-identified patent and that said Letters Patent is hereby corrected as shown below:

COLUMN 3:
Line 22, "tie" should read -- the --.

COLUMN 6:
Line 42, "and-advantages" should read -- and advantages --.

COLUMN 9:
Line 12, "the" should read -- the art --.

COLUMN 20:
Line 66, "include" should read -- includes --.

COLUMN 21:
Line 16, "uses" should read -- use --;
Line 16, "at" should read -- as --;
Line 16, "it" should read -- they --; and
Line 17, "generates" should read -- generate --.

COLUMN 26:
Line 2, "TXFIFOfullO" should read -- TXFIFOfull0 --.

COLUMN 29:
Line 27, "of" (second occurrence) should be deleted.

UNITED STATES PATENT AND TRADEMARK OFFICE
CERTIFICATE OF CORRECTION

PATENT NO. : 7,177,307 B2
APPLICATION NO. : 10/055939
DATED : February 13, 2007
INVENTOR(S) : Frouin et al.

It is certified that error appears in the above-identified patent and that said Letters Patent is hereby corrected as shown below:

COLUMN 30:
Line 64, "tat" should read -- that --.

Signed and Sealed this

Eleventh Day of March, 2008

JON W. DUDAS
*Director of the United States Patent and Trademark Office*